United States Patent
Arikawa et al.

(10) Patent No.: US 9,014,574 B2
(45) Date of Patent: Apr. 21, 2015

(54) OPTICAL RECEIVER, POLARIZATION DEMULTIPLEXER, AND OPTICAL RECEIVING METHOD

(75) Inventors: Manabu Arikawa, Tokyo (JP); Daisaku Ogasahara, Tokyo (JP); Emmanuel Le Taillandier de Gabory, Tokyo (JP); Kiyoshi Fukuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 58 days.

(21) Appl. No.: 14/002,266

(22) PCT Filed: Feb. 28, 2012

(86) PCT No.: PCT/JP2012/055496
§ 371 (c)(1),
(2), (4) Date: Aug. 29, 2013

(87) PCT Pub. No.: WO2012/118215
PCT Pub. Date: Sep. 7, 2012

(65) Prior Publication Data
US 2013/0336654 A1    Dec. 19, 2013

(30) Foreign Application Priority Data
Mar. 2, 2011    (JP) .................... 2011-045189

(51) Int. Cl.
*H04B 10/06* (2006.01)
*H04J 14/06* (2006.01)
*H04B 10/61* (2013.01)

(52) U.S. Cl.
CPC .............. *H04J 14/06* (2013.01); *H04B 10/614* (2013.01); *H04B 10/6166* (2013.01)

(58) Field of Classification Search
USPC ................................................. 398/202–214
See application file for complete search history.

(56) References Cited

U.S. PATENT DOCUMENTS

| 8,086,114 | B2 | 12/2011 | Liu et al. |
| 8,165,465 | B2* | 4/2012 | Tanaka et al. .................... 398/25 |
| 8,406,635 | B2* | 3/2013 | Nakashima et al. .......... 398/158 |
| 8,606,118 | B2* | 12/2013 | Hatae et al. ..................... 398/202 |
| 2010/0003028 | A1 | 1/2010 | Zhang et al. |
| 2010/0092168 | A1* | 4/2010 | Li et al. ........................... 398/16 |
| 2011/0002689 | A1 | 1/2011 | Sano et al. |
| 2011/0229127 | A1 | 9/2011 | Sakamoto et al. |

FOREIGN PATENT DOCUMENTS

| JP | 2009-253972 | 10/2009 |
| JP | 2009-296596 | 12/2009 |
| JP | 2011-199687 | 10/2011 |
| WO | WO 2009/104758 | 8/2009 |
| WO | WO 2010/128577 | 11/2010 |

OTHER PUBLICATIONS

International Search Report, PCT/JP2012/055496, May 29, 2012.
Savory., "Digital filters for coherent optical receivers"., Optics Express 804, vol. 16, No. 2, (2008).
Yan et al., "Adaptive Blind Equalization for Coherent Optical BPSK System" ECOC 2010, Sep. 19-23, 2010, Torino Italy.

* cited by examiner

*Primary Examiner* — M. R. Sedighian
(74) *Attorney, Agent, or Firm* — Young & Thompson

(57) ABSTRACT

In order to appropriately demultiplex the polarization multiplexed BPSK signal without using a training sequence and decreasing the resistance to a frequency offset, an optical receiver includes a coherent optical detection unit receiving an optical signal in which BPSK modulated carrier waves are polarization-multiplexed, performing coherent detection by mixing the received optical signal with local light, and outputting first electrical signals corresponding to the carrier waves; a butterfly FIR filter receiving the first electrical signals and extracting second electrical signals corresponding to each of the carrier waves from the first electrical signals; and a coefficient control unit for calculating a sum of respective phases of the second electrical signals output from the butterfly FIR filter, adaptively controlling tap coefficients of the butterfly FIR filter so that the calculated phase sum may become equal to 0 or $\pi$, and outputting tap coefficients after being controlled to the butterfly FIR filter.

12 Claims, 13 Drawing Sheets

X POLARIZATION OUTPUT SIGNAL $E_x$

Y POLARIZATION OUTPUT SIGNAL $E_y$

FIG.7A  X POLARIZATION OUTPUT SIGNAL $E_x$
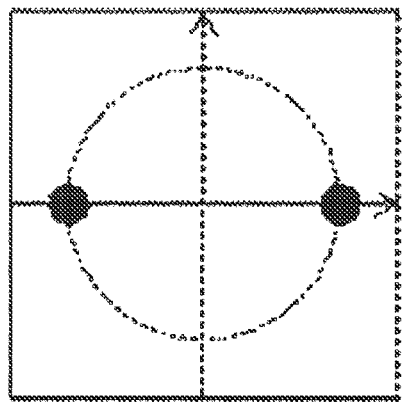
FIG.7B
Y POLARIZATION OUTPUT SIGNAL $E_y$
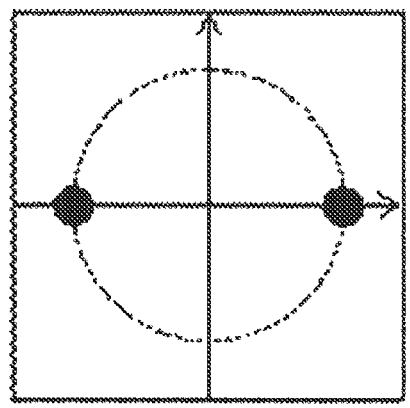
FIG.7C  $E_x\ E_y$
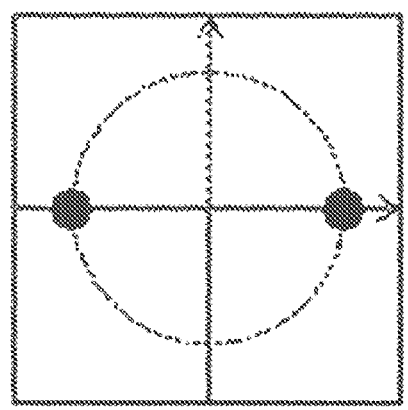

X POLARIZATION OUTPUT SIGNAL $E_x$

Y POLARIZATION OUTPUT SIGNAL $E_y$ $E_x \, E_y$

X POLARIZATION OUTPUT SIGNAL $E_x$

Y POLARIZATION OUTPUT SIGNAL $E_y$

OPTICAL RECEIVER, POLARIZATION DEMULTIPLEXER, AND OPTICAL RECEIVING METHOD

TECHNICAL FIELD

The present invention relates to optical receivers, polarization demultiplexers, and optical receiving methods, in particular, to an optical receiver, a polarization demultiplexer, and an optical receiving method which are used for a polarization multiplexed coherent optical receiving device.

BACKGROUND ART

A coherent optical receiving system in an optical transmission system has become important with the request for increasing the capacity in the communication environment. In the coherent optical receiving system, information is transmitted by means of applying information to be transmitted to either or both of optical amplitude and optical phase. In order to receive the information applied to the amplitude or the phase, the received light is mixed with local oscillation light whose light frequency is nearly equal to that of the received light, and the interfering light arising from the mixture is detected by an optical detector and transformed into an electrical signal. The transformed electrical signal is digitally processed by a digital signal processing circuit in a following stage, and then a demodulated signal is obtained.

In such optical transmission system, a polarization multiplexing technology, in which two separate signals are multiplexed and transmitted using two orthogonal polarized waves (X and Y) of light, makes it possible to achieve twofold spectrum efficiency compared with that in an optical transmission system using a single polarized wave. In these days, the polarization multiplexing coherent optical receiving technology, therefore, has been used in many optical transmission systems.

FIG. 1 is a block diagram illustrating an example of a configuration of a common optical receiving device to which the polarization multiplexing coherent optical receiving system is applied.

An optical receiving device 500 receives, in the coherent receiving system, signal light in which a modulated carrier wave is polarization-multiplexed, as input signal light. As an example of a modulation system, there are a phase-shift keying modulation and a quadrature amplitude modulation. The phase-shift keying modulation is exemplified here as a modulation system.

Signal light propagating through an optical fiber transmission line (not shown) enters a polarization beam splitter 511 in the optical receiving device. The polarization beam splitter 511 splits the entered signal light into an X-component polarized wave and a Y-component polarized wave. Each split component is output to optical hybrid circuits 521 and 522 corresponding to each component. Local oscillation light output from a local oscillation light source 560 is also split into an X-component polarized wave and a Y-component polarized wave by a polarization beam splitter 512 and output to the optical hybrid circuits 521 and 522 corresponding to each component.

Each of the optical hybrid circuits 521 and 522 mixes the input signal light with the local oscillation light, and outputs a couple of light beams whose phase are different from each other by 90 degrees, that is, I (In-phase) component and Q (Quadrature) component.

The I component light and the Q component light are input into O/E (Optical/Electrical) conversion units 531 and 532 respectively, photoelectric-converted and output as analog electrical signals with the gains adjusted. The analog electrical signals are input into A/D (Analog/Digital) conversion units 541 and 542 respectively, sampled at appropriate time intervals and converted into quantized digital signals.

Thus the input optical signal is converted into one digital signal component ($I_X$ and $Q_X$: In-phase and Quadrature in X polarization) and the other digital signal component ($I_Y$ and $Q_Y$: In-phase and Quadrature in Y polarization), and digitally processed by a digital signal processing unit 550.

A polarization state of a signal in the optical fiber transmission line is made to change due to various external factors such as a pressure applied to the optical fiber. As a result, although the signal is multiplexed on the X polarization and the Y polarization respectively as separate signals at the transmitting side, the signal is received at the receiving side including a signal multiplexed in the other side of the X polarization and the Y polarization because a crosstalk arises during the optical fiber transmission. That is to say, the ($I_X$, $Q_X$) component and the ($I_Y$, $Q_Y$) component of digital signals before being input into the digital signal processing unit 550 are in an incomplete polarization demultiplexed state. The received signal also includes a transmission distortion due to transmission through the optical fiber.

The digital signal processing unit 550 performs an equalization processing of the digital signal in such state, demodulates the signal which has been modulated and transmitted at the transmission side and outputs the demodulated signal.

FIG. 2 is a block diagram illustrating an example of a configuration of a butterfly FIR (Finite Impulse Response) filter used in the digital signal processing unit 550.

The butterfly FIR filter performs the equalization processing for polarization mode dispersion and the polarization demultiplexing, and its function in outline is described below.

The butterfly FIR filter includes FIR filters and a coefficient control units 611 and 612 which generate tap coefficients to provide each FIR filter. Complex adders 631 and 632 are also included which add extracted signals having the same polarization component. In FIG. 2, each of the FIR filters is represented by an hxx filter 621, an hxy filter 622, an hyx filter 623, and an hyy filter 624.

For example, a signal multiplexed on the X polarized wave at the transmission side is represented by h, and a signal multiplexed on the Y polarized wave is represented by v. At the receiving side, as described above, the X polarized wave including the signal v and the Y polarized wave including the signal h are received.

In FIG. 2, a signal corresponding to an electric field of each polarization is input. An X polarization input signal $E_X$ is input into the $h_{xx}$ filter 621 and the $h_{yx}$ filter 623, and a Y polarization input signal $E_Y$ is input into the $h_{yy}$ filter 624 and the $h_{xy}$ filter 622.

By adding the X polarization input signal optimally weighted by the $h_{xx}$ filter 621 to the Y polarization input signal optimally weighted by the $h_{xy}$ filter 622 in the complex adder 631, the signal v multiplexed on the X polarized wave and the signal v multiplexed on the Y polarized wave are canceled, and the signal h is output as the X polarization output signal $E_x$.

Similarly, by adding the Y polarization input signal optimally weighted by the $h_{yy}$ filter 624 to the X polarization input signal optimally weighted by the $h_{yx}$ filter 623 in the complex adder 631, the signal h multiplexed on the Y polarized wave and the signal h multiplexed on the X polarized wave are canceled, and the signal v is output as the Y polarization output signal $E_y$.

Thus, the butterfly FIR filter demultiplexes and outputs an original signal multiplexed on each polarized wave so as to output the signal h as the X polarization output signal $E_x$ and the signal v as the Y polarization output signal $E_y$.

The coefficient control unit 611 and 612 monitor output signals from the complex adders 631 and 632, and always have control to provide adaptively optimum filter tap coefficients, so that the butterfly FIR filter can function as described above.

The polarization state of the signal in the optical fiber transmission line fluctuates fast due to various external factors. In order to control the above-mentioned polarization demultiplexing appropriately, therefore, it is necessary to match the polarization direction of the signal assumed at the receiving side with the polarization direction at the transmitting side in some way. As an algorithm to control tap coefficients for the polarization demultiplexing in such digital signal processing, a CMA (Constant Modulus Algorithm) is commonly known (see Non Patent Literature 1, item 5, for example).

The tap coefficient of the butterfly FIR filter is updated according to the updating rule exemplified in Non Patent Literature 1. The CMA is mainly used in order to demultiplex the signal in which an M-value phase modulation signal with constant amplitude of a signal, in particular, a QPSK (Quadrature Phase Shift Keying) signal, is multiplexed. The updating the tap coefficient using the CMA is performed so that the amplitude of an output signal may become constant. The updated coefficient of the butterfly FIR filter by that means converges so as to have characteristics reverse to the effect given to a transmission signal in the transmission line, and the polarization demultiplexing and the polarization mode dispersion compensation are carried out.

The Least Mean Square (LMS) algorithm is known as another algorithm used for performing the polarization demultiplexing. This is the algorithm including a decision of a received signal, and it is necessary to secure the convergence of the initial tap coefficient by using a training sequence. The use of such training leads to an increase in a line rate for a constant payload. On the other hand, the CMA is a blind signal processing without the decision of the received signal, and has an advantage in a convergent rate of tap coefficient and its simple configuration.

Patent literature 1 discloses an adaptive blind equalization device which is available for the polarization multiplexing coherent optical receiving device. The adaptive blind equalization device in patent literature 1 can prevent, without providing the training sequence, the problem in the CMA that the output signal of the X polarization component and the output signal of the Y polarization component converge to the same information source. The adaptive blind equalization device appropriately stops and restarts the output of the filter coefficient from a filter coefficient updating unit for the X polarization or one for the Y polarization, which operates independently, so that each output of the polarization components does not converge to the same information source.

Patent literature 2 discloses a filter coefficient adjusting device, in a polarization demultiplexer for an optical coherent receiver, which solves the problem in the CMA that two channels of an output signal converge to the same signal source. The filter coefficient adjusting device adjusts a filter coefficient so that the probability density of the output signal may approach a target of the probability density as much as possible. The target probability density is calculated under the condition that two channels of the signal converge to different sources.

Non Patent Literature 2 points out that, in the polarization demultiplexing system using the CMA, it is impossible to demultiplex appropriately the polarizations of the signal which is multiplexed in the polarization and modulated by the BPSK (Binary Phase Shift Keying). And Non Patent Literature 2 discloses a technology to solve the problem about the polarization demultiplexing for the BPSK signal by using CMA. The system disclosed in Non Patent Literature 2 utilizes a product of the output signals at two consecutive time points in either the X polarization component or the Y polarization component which is output from a butterfly FIR filter.

Patent Literature 1: Japanese Patent Application Laid-Open Publication No. 2009-253972

Patent Literature 2: Japanese Patent Application Laid-Open Publication No. 2009-296596

Non Patent Literature 1: S. J. Savory, 'Digital filters for coherent optical receivers,' Opt. Express Vol. 16, No. 2, 804 (2008)

Non Patent Literature 2: Meng Yan et al., 'Adaptive Blind Equalization for Coherent Optical BPSK System' ECOC 2010, 19-23 Sep. 2010, Torino, Italy

DISCLOSURE OF INVENTION

Problem to be Solved by the Invention

In the coherent optical receiving by the digital signal processing, if the CMA is employed as a tap coefficient control algorithm, there is the problem that it is impossible to demultiplex appropriately the polarizations of the signal which is multiplexed in the polarization and modulated by the BPSK (hereinafter "signal modulated by the BPSK" is referred to as "BPSK signal"). This is what Non Patent Literature 2 also points out.

If the CMA is used as the tap coefficient control algorithm in order to demultiplex the polarization multiplexed BPSK signal, the tap coefficients can converge wrongly without converging to an intended state.

FIG. 3A and FIG. 3B exemplify constellation diagrams which can arise when the polarization multiplexed BPSK signal is demultiplexed in polarization by using the CMA. Two BPSK signals are polarization-multiplexed on two carriers with a relative phase of $\pi/2$ and transmitted, and then the coherent received signal is polarization demultiplexed using the CMA, and consequently the X polarization input signal $E_x$ and the Y polarization input signal $E_y$ are output, which are illustrated in FIG. 3A and FIG. 3B.

Since the output signals exemplified in FIG. 3A and FIG. 3B do not coincide with the constellation of signal points for the BPSK signal, it is shown that the polarization demultiplexing is not performed appropriately.

The reason will be described below.

The signal points of the BPSK signals are represented as follows.

$$E = \exp(i\pi m), m = 0, 1$$

When the following two BPSK signals $$E_x = \exp(i\pi m_x), E_y = \exp(i\pi m_y), m_x, m_y = 0, 1$$

are mixed with a phase difference of $\pi/2$ between respective carrier phases, the following formula is given, $$E = \alpha E_x + i\sqrt{1-\alpha^2} E_y = \alpha \exp(i\pi m_x) + i\sqrt{1-\alpha^2} \exp(i\pi m_y)$$

where $\alpha$ is a real number which meets the following condition, and a phase term, by which all terms in the right side of the formula are multiplied, is omitted.

$$0 \leq \alpha \leq 1$$

Since the above formula satisfies the following formula even if α≠0, 1, the tap coefficient of the FIR filter is not updated according to the updating rule for the CMA described in Non Patent Literature 1.

$$1-|E|^2=0$$

That is to say, if the BPSK signal which is mixed with a relative phase of π/2 between carrier phases enters the input of the butterfly FIR filter, the convergence of the tap coefficients has been completed with the CMA outputting undesired signals. If the output becomes the above signal according to the updating rule for the tap coefficients of the CMA, the same results are produced.

If the output signal which has been polarization demultiplexed, therefore, does not coincide with the signal location of the BPSK signal, an error in the signal decision arises at the receiving side and consequently a bit error rate increases. A signal processing circuit for BPSK demodulation does not work which is designed on the assumption that the receiving signal is located at the signal point of the BPSK signal.

The BPSK modulation system is a modulation system in which the distance between the signal points becomes the largest distance if an average intensity of an optical signal is kept constant, and the transmission distance without relay elongates by using the signal modulated by the system. The BPSK modulation system, therefore, has advantage in a communication system for the long-haul transmission such as submarine cable communication. A system is required, therefore, in which it is possible to polarization demultiplex appropriately the polarization multiplexed BPSK signal without using a training sequence.

Although Patent Literature 1 and Patent Literature 2 discloses the technology which solves the problem of the polarization demultiplexing by the CMA, but it is a problem that two channels of the output signal converge to the same signal source. Patent Literature 1 and Patent Literature 2, therefore, do not take into consideration the problem of the CMA with respect to the above-mentioned polarization multiplexed BPSK signal.

Non Patent Literature 2 discloses the technology solving the problem of polarization demultiplexing of the BPSK signal by the CMA. Since the technology disclosed in Non Patent Literature 2 utilizes a product of the output signals at two consecutive times of the same signal, there is a problem that the resistance to a frequency offset is reduced.

The objective of the present invention is to provide an optical receiver, a polarization demultiplexer, and an optical receiving method which can appropriately demultiplex the polarization multiplexed BPSK signal without using a training sequence and decreasing the resistance to a frequency offset.

Means for Solving a Problem

An optical receiver according to an exemplary aspect of the invention includes a coherent optical detection means receiving an optical signal in which a plurality of BPSK modulated carrier waves are polarization-multiplexed, performing coherent detection by mixing the received optical signal with local light, and outputting a plurality of first electrical signals corresponding to the plurality of carrier waves; a butterfly FIR filter receiving the plurality of first electrical signals and extracting a plurality of second electrical signals corresponding to each of the plurality of carrier waves from the plurality of first electrical signals; and a coefficient control means for calculating a sum of respective phases of the second electrical signals output from the butterfly FIR filter, adaptively controlling tap coefficients of the butterfly FIR filter so that the calculated phase sum may become equal to 0 or π, and outputting tap coefficients after being controlled to the butterfly FIR filter.

A polarization demultiplexer according to an exemplary aspect of the invention includes a butterfly FIR filter extracting two signals polarization-multiplexed and BPSK modulated at a transmitting side as each second polarization component signal, from respective first polarization component signals in two orthogonal polarized waves demultiplexed by a coherent optical detection means; and a coefficient control means for adaptively controlling tap coefficients of the butterfly FIR filter so that a sum of a phase of each second polarization wave component signal output from the butterfly FIR filter may become equal to 0 or π, and outputting the tap coefficients to the butterfly FIR filter.

An optical receiving method according to an exemplary aspect of the invention includes receiving an optical signal in which a plurality of BPSK modulated carrier waves are polarization-multiplexed, performing coherent detection by mixing the received optical signal with local light, and outputting a plurality of first electrical signals corresponding to the plurality of carrier waves; inputting the plurality of first electrical signals into a butterfly FIR filter, and extracting each of a plurality of second electrical signals corresponding to each of the plurality of carrier waves from the plurality of first electrical signals; and calculating a sum of respective phases of the second electrical signals output from the butterfly FIR filter, adaptively controlling tap coefficients of the butterfly FIR filter so that the calculated phase sum may become equal to 0 or π, and outputting tap coefficients after being controlled to the butterfly FIR filter.

Effect of the Invention

According to the present invention, in the coherent optical reception, it is possible to demultiplex appropriately the polarization multiplexed BPSK signal without using a training sequence and decreasing the resistance to a frequency offset.

BRIEF DESCRIPTION OF THE DRAWINGS

FIG. 7A is an image diagram of a constellation diagram of an output signal of an intended X polarization component output from a polarization demultiplexing unit in the second exemplary embodiment.

FIG. 7B is an image diagram of a constellation diagram of an output signal of an intended Y polarization component output from the polarization demultiplexing unit in the second exemplary embodiment.

FIG. 7C is an image diagram of a constellation diagram of a product of the X polarization component and the Y polarization component output from the polarization demultiplexing unit in the second exemplary embodiment.

DESCRIPTION OF EMBODIMENTS

The exemplary embodiments of the present invention will be described with reference to drawings.

Figure 4:
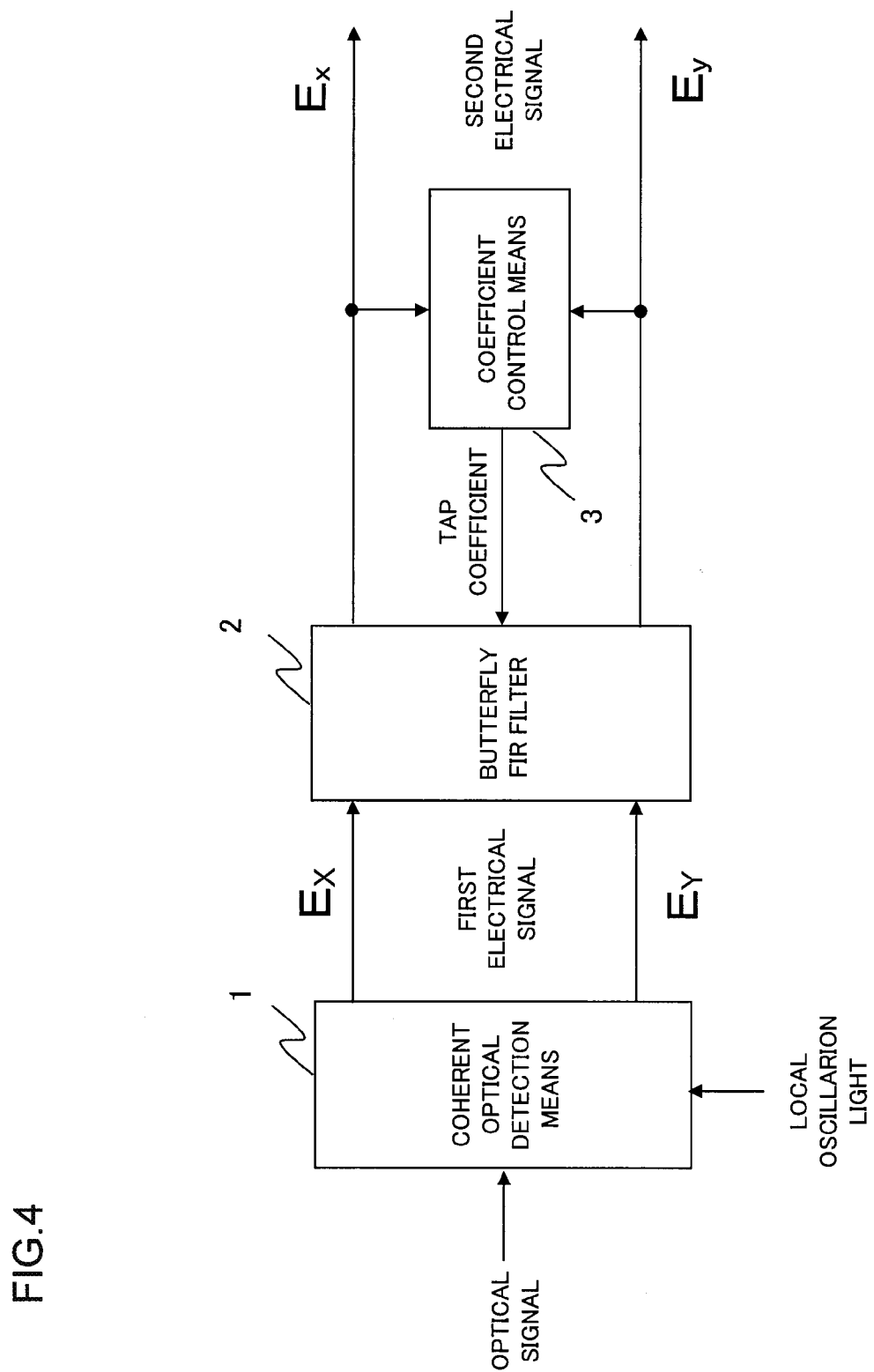
FIG. 4 is a block diagram illustrating a configuration of an optical receiver of the first exemplary embodiment of the present invention.

FIG. 4 is a block diagram illustrating a configuration of an optical receiver of a first exemplary embodiment of the present invention.

The exemplary embodiment is just exemplification, and disclosed devices and systems are not limited to the following configurations of the exemplary embodiments.

An optical receiver of the first exemplary embodiment includes a coherent optical detection means 1, a butterfly FIR filter 2, and a coefficient control means 3.

The coherent optical detection means 1 receives an optical signal in which a plurality of BPSK modulated carrier waves are polarization-multiplexed, and performs coherent detection by mixing the received optical signal with local light, and outputs a plurality of first electrical signals corresponding to the plurality of carrier waves.

The butterfly FIR filter 2 receives the plurality of first electrical signals output from the coherent optical detection means 1, and extracts from the plurality of first electrical signals a plurality of second electrical signals corresponding to a plurality of carrier waves respectively.

The coefficient control means 3 calculates a sum of the phase in the respective second electrical signals output from the butterfly FIR filter 2, adaptively controls the tap coefficients of the butterfly FIR filter 2 so that the calculated phase sum may become equal to zero or $\pi$, and outputs the tap coefficients after being controlled to the butterfly FIR filter 2.

The butterfly FIR filter 2 and the coefficient control means 3 shown in FIG. 4 correspond to a part of a polarization demultiplexer. The above-described first electrical signals are respective polarization component signals ($E_X$, $E_Y$) of two orthogonal polarized waves demultiplexed by the coherent optical detection means 1, and the second electrical signals output from the butterfly FIR filter are the respective polarization component signals ($E_x$, $E_y$).

That is to say, the butterfly FIR filter 2 extracts two signals which are BPSK modulated and polarization multiplexed at a transmitting side as respective second polarization component signals ($E_x$, $E_y$) from respective first polarization component signals ($E_X$, $E_Y$) of two orthogonal polarized waves demultiplexed by the coherent optical detection means 1.

The coefficient control means 3 adaptively controls the tap coefficients of the butterfly FIR filter 2 so that a sum of the phase in the respective second polarization component signals ($E_x$, $E_y$) output from the butterfly FIR filter 2 may become equal to zero or $\pi$. That is to say, the coefficient control means 3 monitors an output signal of the butterfly FIR filter 2, appropriately updates the tap coefficients so that a sum of the phase in the respective polarization output signals of two orthogonal polarized waves may become equal to zero or $\pi$, and outputs them to the butterfly FIR filter 2.

To adaptively control the tap coefficients is to change the tap coefficients of the butterfly FIR filter 2 on the basis of predetermined algorithm depending on an input and an output of the butterfly FIR filter 2 making the butterfly FIR filter 2 operating, for example.

That is to say, when the polarization demultiplexing is appropriately performed and an intended state has been achieved, the phase of the product of the output signals becomes equal to zero or $\pi$ in multiplying respective output signals of respective second polarization component signals output from the butterfly FIR filter 2.

Figure 5:
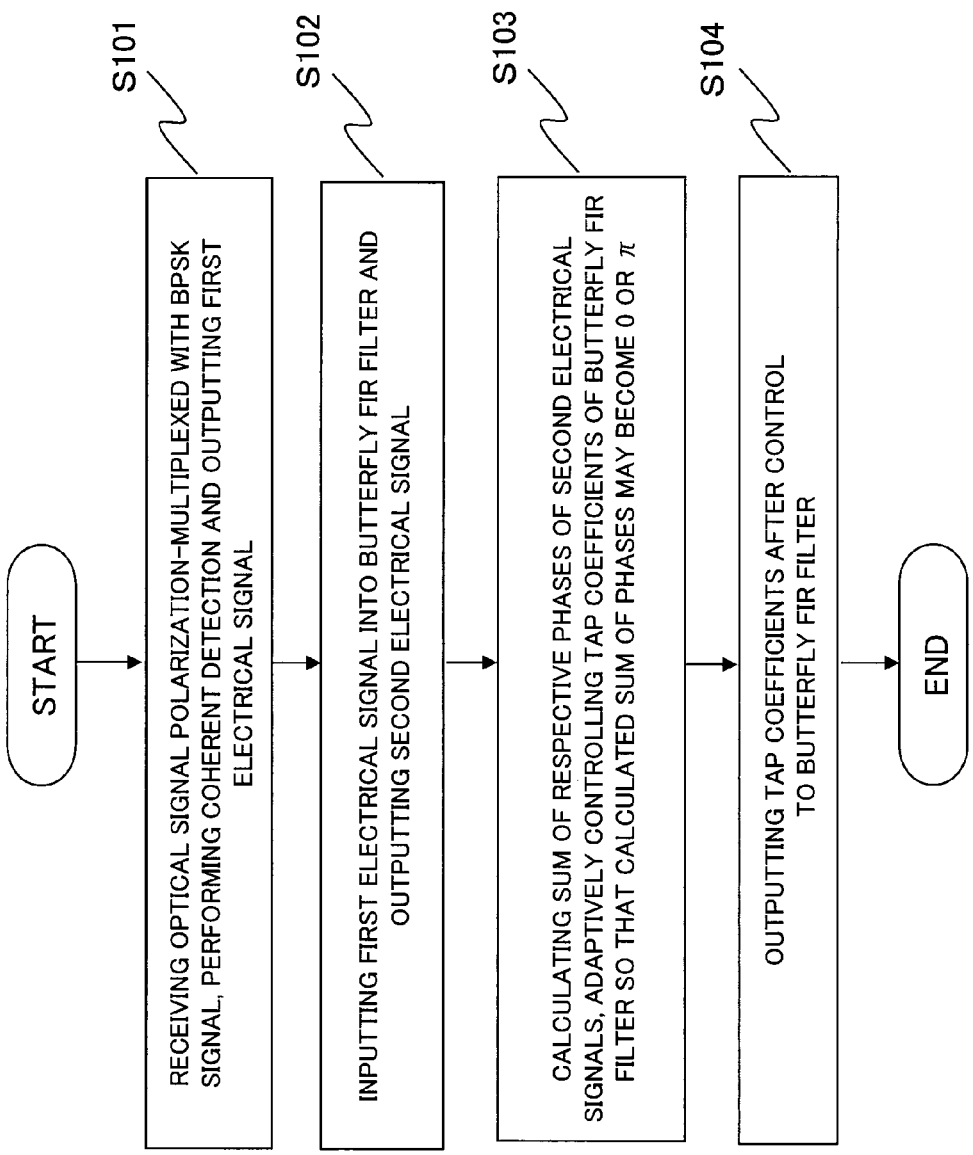
FIG. 5 is a flow chart illustrating an operation of the optical receiver of the first exemplary embodiment of the invention.

FIG. 5 is a flow chart illustrating an operation of the optical receiver in the first exemplary embodiment.

An optical signal is received in which a plurality of BPSK modulated carrier waves are polarization-multiplexed, the coherent detection is performed by mixing the received optical signal with the local oscillation light, and a plurality of first electrical signals corresponding to a plurality of carrier waves are output (S101). The plurality of first electrical signals are input into the butterfly FIR filter, and a plurality of second electrical signals corresponding to each of the plurality of carrier waves are extracted from the plurality of first electrical signals (S102). A sum of respective phases of the second electrical signals output from the butterfly FIR filter is calculated and the tap coefficients of the butterfly FIR filter are adaptively controlled so that the calculated phase sum may become equal to zero or π (S104). And then, the tap coefficients after being controlled are output to the butterfly FIR filter (S104).

Thus, the optical receiver in the first exemplary embodiment monitors the second electrical signals output from the butterfly FIR filter, calculates a sum of the respective phases of the second electrical signals, and adaptively controls and outputs the tap coefficients of the butterfly FIR filter so that the calculated sum of the phases may become equal to zero or π. That is to say, in the part of the polarization demultiplexer, the respective second polarization component signals which are output from the butterfly FIR filter and polarization demultiplexed (respective output signals of X polarized wave component and Y polarized wave component) are monitored, the tap coefficients are appropriately updated and output so that a sum of the phase of the two signals may become equal to zero or π, ted. That is, the respective second polarization component signals (respective output signals of X polarized wave component and Y polarized wave component) are multiplied, and the tap coefficients are controlled and appropriately updated so that the phase of the product may become equal to zero or π.

Thereby, it is possible to appropriately demultiplex the BPSK signals which are polarization multiplexed and transmitted without using a training sequence. Since the information on the product of the respective second polarization component signals (respective output signals of X polarized wave component and Y polarized wave component) output from the butterfly FIR filter is used as a guideline for the control, it is possible to perform the processing without decreasing the resistance to a frequency offset.

Next, the second exemplary embodiment will be described.

First, a system configuration is described.

Figure 6:
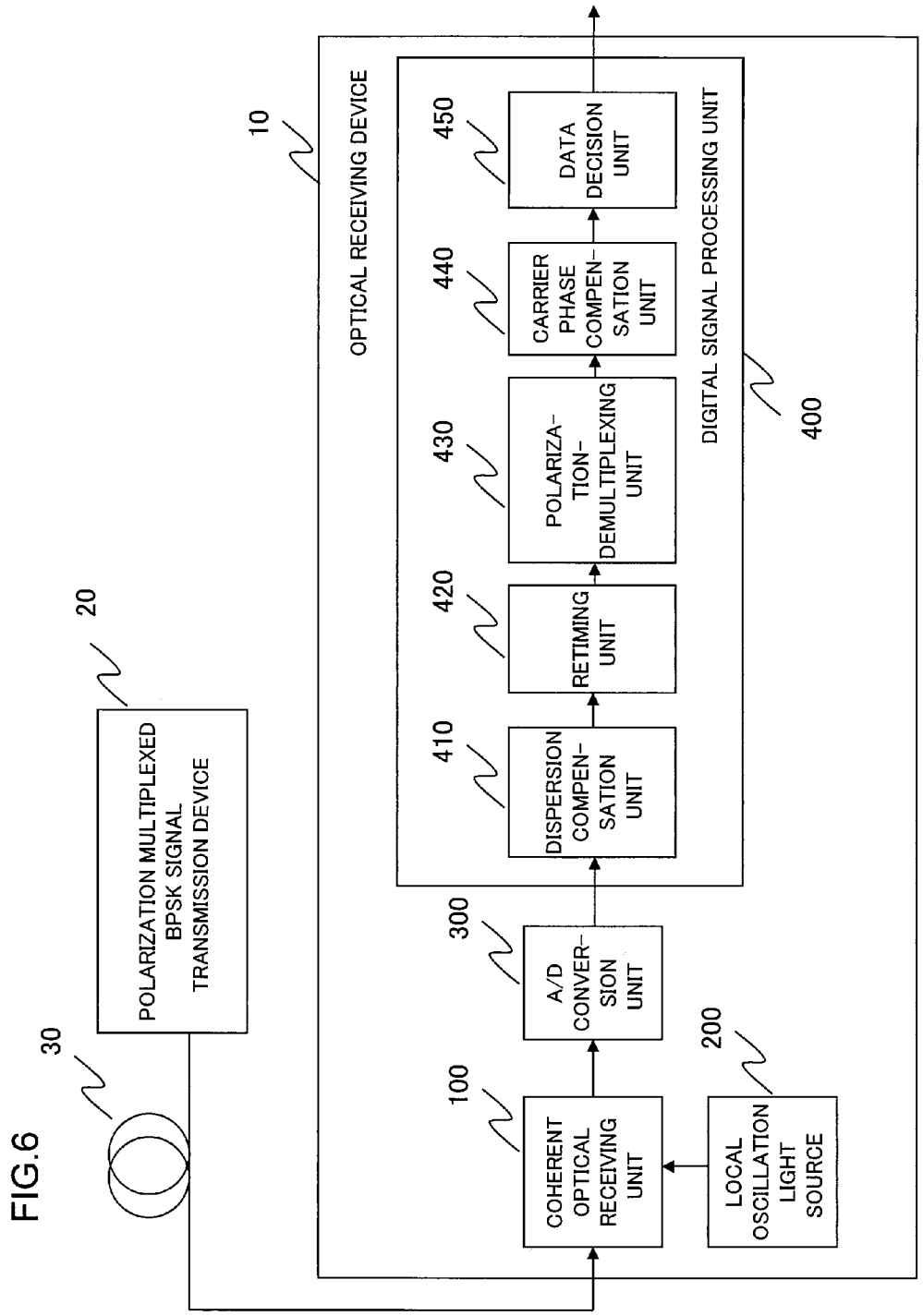
FIG. 6 is a block diagram illustrating a configuration of an optical transmission system using an optical receiving device including the optical receiver in the exemplary embodiment of the present invention.

FIG. 6 is a block diagram illustrating a configuration of an optical transmission system using an optical receiving device including an optical receiver of the present invention.

A polarization multiplexed BPSK signal transmission device 20 transmits a light signal in which two BPSK signals are polarization-multiplexed. The light signal in which two BPSK signals are polarization-multiplexed passes through an optical fiber transmission line 30 and is received by an optical receiving device 10.

Figure 1:
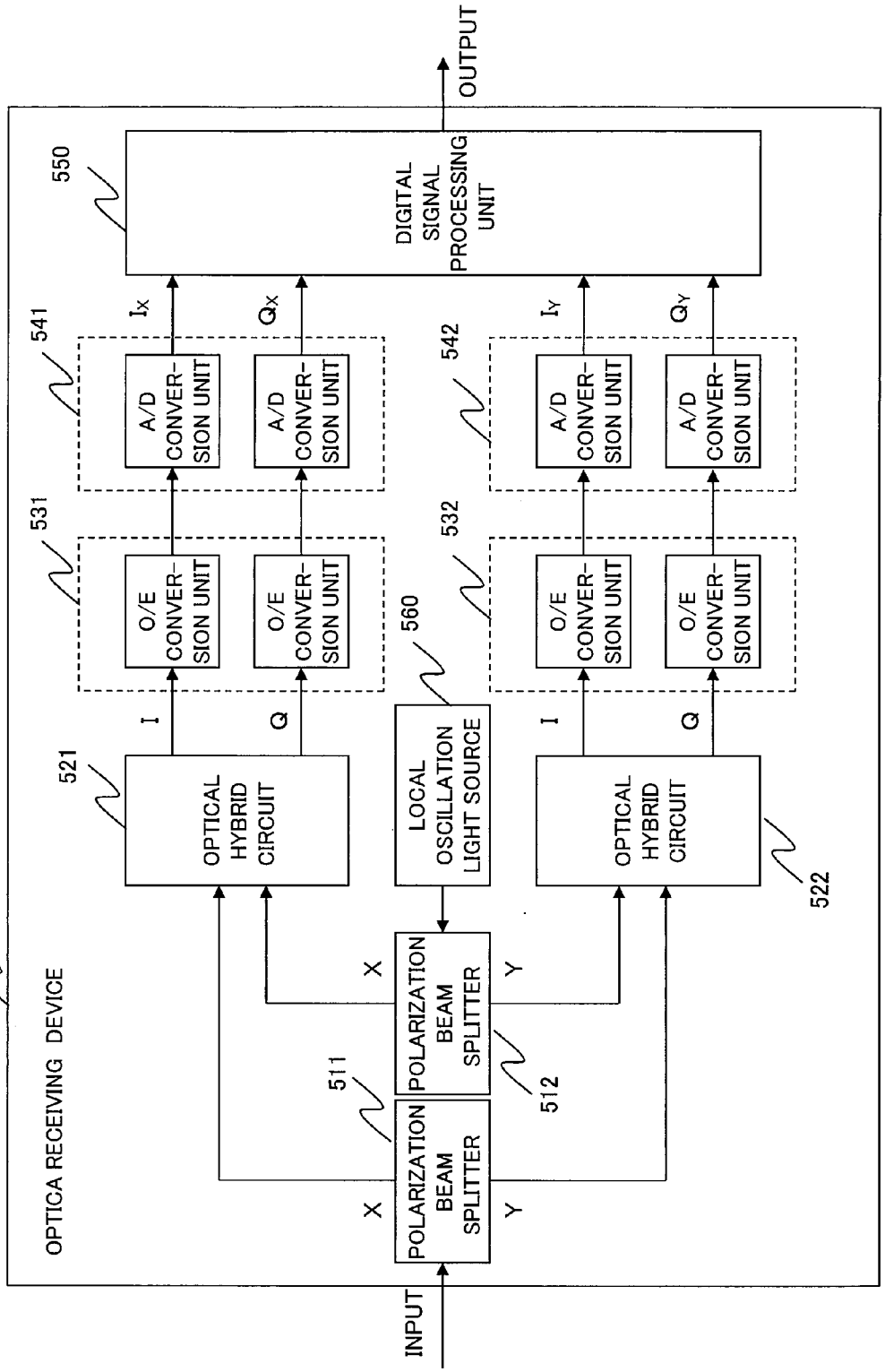
FIG. 1 is a block diagram illustrating an example of a configuration of a commonly-used optical receiving device to which the polarization multiplexing coherent optical receiving system is applied.
Figure 2:
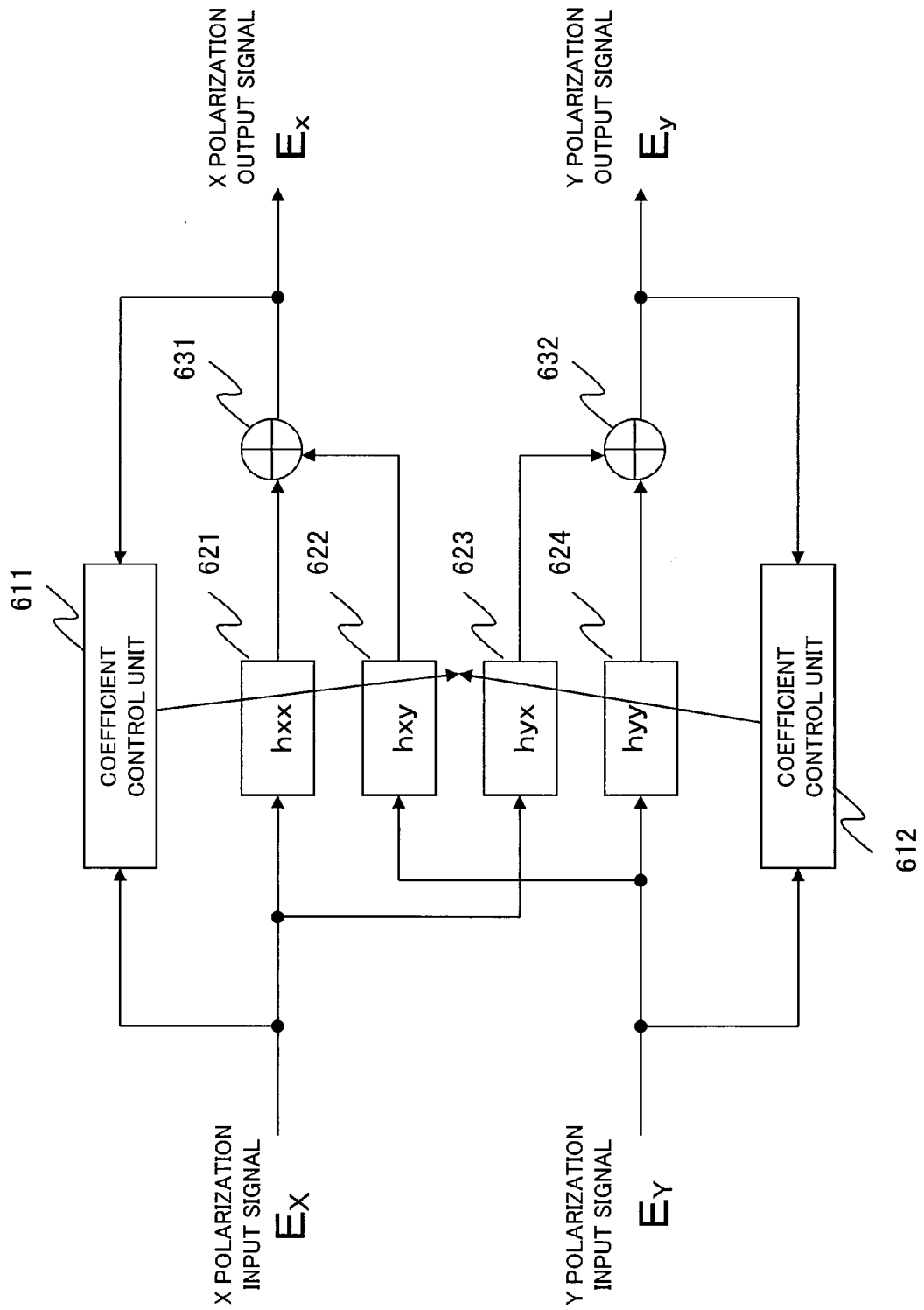
FIG. 2 is a block diagram illustrating an example of a configuration of a butterfly FIR filter used in the digital signal processing unit.

The optical receiving device 10 includes a coherent optical receiving unit 100, a local oscillation light source 200, A/D conversion unit 300, and a digital signal processing unit 400. The coherent optical receiving unit 100 includes the polarizing beam splitters 511 and 512, the optical hybrid circuits 521 and 522, and the O/E conversion units 531 and 532 in the optical receiving device 500 described in FIG. 1.

The polarization multiplexed optical signal which is received by the optical receiving device 10 is split into an X polarization component and a Y polarization component by the coherent optical receiving unit 100, each of the polarization components is mixed with the local oscillation light output from the local oscillation light source 200 and the coherent detection is performed. That is to say, the optical signal is detected by the optical hybrid circuit of 90 degrees optical hybrid and an optical detector included in the O/E conversion unit, and signals corresponding to a real part and an imaginary part of a complex envelop of an electrical field of the received optical signal, are extracted as electrical signals for each polarization component.

The output of the coherent optical receiving unit 100 is converted into digital signals by the A/D conversion unit 300, and sent to the digital signal processing unit 400.

The digital signals sent to the digital signal processing unit 400 correspond to a real component ($E_{Xi}$) and an imaginary component ($E_{Xq}$) of the complex envelope of the electrical field of the X polarization component and a real component ($E_{Yi}$) and an imaginary component ($E_{Yq}$) of the complex envelope of the electrical field of the Y polarization component.

In the digital signal processing unit 400, a process for correcting signal deterioration in the optical fiber transmission line is performed and then signal data are decided.

For example, as shown in FIG. 6, the digital signal processing unit 400 includes a dispersion compensation unit 410, a retiming unit 420, a polarization demultiplexing unit 430, a carrier phase compensation unit 440, and a data decision unit 450. The polarization demultiplexing unit 430 corresponds to a part of the polarization demultiplexer in the optical receiver of the first exemplary embodiment mentioned above, the polarization demultiplexer in the optical receiver of the second exemplary embodiment, and a polarization demultiplexer in an optical receiver of the third exemplary embodiment mentioned below.

In the dispersion compensation unit 410 and the retiming unit 420, the compensation for the chromatic dispersion in a transmission line and the optimization of sampling timing performed in the A/D conversion unit 300 through resampling are carried out, respectively. The processed signals are input into the polarization demultiplexing unit 430.

In the descriptions, a sampling rate after resampling is one sample per one symbol time. It is also acceptable that a sampling rate after resampling is N samples per one symbol time, and then the sampling rate is configured as one sample per one symbol time by disposing a down-sampling unit (not shown) behind the polarization demultiplexing unit 430.

The polarization demultiplexing unit 430 carries out a polarization demultiplexing signal processing. In general, a polarization component of an optical signal received by a receiver is different from a polarization component at the time of transmission by a transmitter. That is to say, signals of each polarization component ($E_X$, $E_Y$) output from the coherent optical receiving unit are mixed with signals of each polarization component at the time of transmission at the transmitting side. The polarization demultiplexing unit 430, therefore, performs processes for polarization demultiplexing by using a butterfly FIR filter and extracting signals of the original polarization component ($E_x$, $E_y$) at the time of transmission by a transmitter.

The output of the polarization demultiplexing unit 430 is input into the carrier phase compensation unit 440, and a carrier phase is compensated. The data decision unit 450 carries out a data decision, and outputs the decided data as receiving data.

Next, a processing executed in the polarization demultiplexing unit 430 is described in detail.

In the description, the digital signal processing handles a complex number. It is also acceptable to divide a complex number into a real part and an imaginary part and replace the signal processing for complex values with an operation on only real number.

An X polarization signal $E_X=E_{Xi}+iE_{Xq}$ and a Y polarization signal $E_Y=E_{Yi}+iE_{Yq}$ are input into the polarization demultiplexing unit 430.

A coefficient control unit included in the polarization demultiplexing unit 430 adaptively controls tap coefficients so that a sum of the phases of two signals split and output by the butterfly FIR filter may become equal to zero or π. In other words, the coefficient control unit adaptively controls tap coefficients of the butterfly FIR filter on the basis of the information on the product of the two signals of the X polarization output signal and the Y polarization output signal from the butterfly FIR filter.

First, the principle of the operation of the present exemplary embodiment is described.

It is considered that two BPSK signals described below are polarization-multiplexed.

$$E'_x = \exp(i\pi m_x + i\Phi_x), E'_y = \exp(i\pi m_y + i\Phi_y), m_x, m_y = 0, 1$$

Here, $\Phi_x$ and $\Phi_y$ represent carrier phases.

The signals which are polarization-multiplexed at the transmitting side, when the optical receiving device 10 at the receiving side receives them, are mixed into a polarization component which is different from the expected polarization component. Taking into consideration the incompleteness of the coherent optical receiving unit 100, the outputs can be described as follows.

$$E_X = \alpha_{xx} \exp(i\pi m_x + i\Phi_x) + \alpha_{xy} \exp(i\pi m_y + i\Phi_y)$$

$$E_Y = \alpha_{yx} \exp(i\pi m_x + i\Phi_x) + \alpha_{yy} \exp(i\pi m_y + i\Phi_y)$$

When the outputs are input into the polarization demultiplexing unit 430, properly demultiplexed in polarization, and output in an intended state, the following formulae are obtained.

$$E_x = \exp(i\pi m_x)$$

$$E_y = \exp(i\pi m_y)$$

where each output is normalized.

On the other hand, when the polarization demultiplexing is carried out using the CMA in the polarization demultiplexing unit 430 and improper convergence arises, the state can be described as follows.

$$E_x = \alpha \exp(i\pi m_x + i\phi_X) + i\sqrt{1-\alpha^2} \exp(i\pi m_y + i\phi_X), 0 < \alpha < 1$$

$$E_y = \beta \exp(i\pi m_y + i\phi_Y) + i\sqrt{1-\beta^2} \exp(i\pi m_x + i\phi_Y), 0 < \beta < 1$$

Here, an amount of $E_x E_y$ is considered which is a product obtained by multiplying the output signal $E_x$ of the X polarization component and the output signal $E_y$ of the Y polarization component together. If the polarization demultiplexing is performed properly and each of polarization component signals is output in the intended state, the following formula is obtained. $E_x E_y = \exp(i\pi(m_x + m_y))$ On the other hand, if the polarization demultiplexing is carried out using the CMA and improper convergence arises, the product is described as follows.

$$E_x E_y = \exp(i(\phi_X + \phi_Y))[(\alpha\beta + \sqrt{1-\alpha^2}\sqrt{1-\beta^2})\exp(i\pi(m_x+m_y)) + i(\alpha\sqrt{1-\beta^2} + \beta\sqrt{1-\alpha^2})]$$

That is to say, in the intended state in which the polarization demultiplexing is properly performed, the sum of the respective output signals of the X polarization component and the Y polarization component output from the polarization demultiplexing unit 430 becomes equal to zero or π. In contrast, in the state in which the improper convergence arises with the polarization demultiplexing being carried out using the CMA, the above result cannot be obtained due to the following term.

$$i(\alpha\sqrt{1-\beta^2} + \beta\sqrt{1-\alpha^2})$$

FIG. 7A, FIG. 7B, and FIG. 7C show image diagrams of constellation diagrams of respective output signals of the intended X polarization component and the Y polarization component which are output from the polarization demultiplexing unit 430 when the polarization demultiplexing is performed properly, and the product of the two output signals, respectively.

Figure 8A:
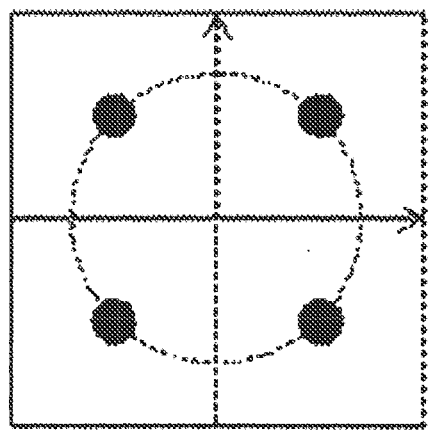
FIG. 8A is an image diagram of a constellation diagram of an output signal of an X polarization component output from a polarization demultiplexing unit when the polarization demultiplexing is carried out using the CMA and improper convergence arises.
Figure 8B:
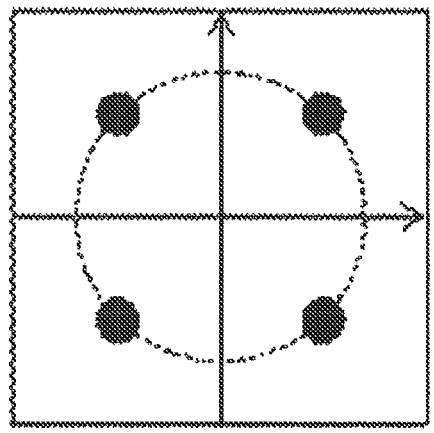
FIG. 8B is an image diagram of a constellation diagram of an output signal of a Y polarization component output from the polarization demultiplexing unit when the polarization demultiplexing is carried out using the CMA and improper convergence arises.
Figure 8C:
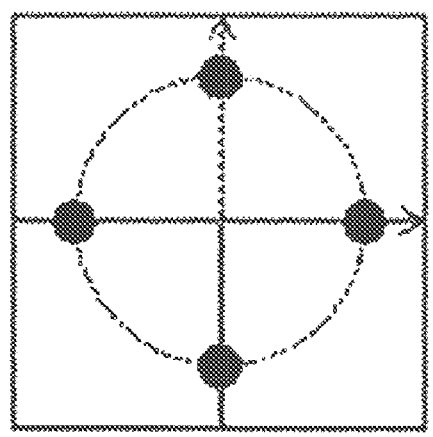
FIG. 8C is a an image diagram of a constellation diagram of a product of an output signal of the X polarization component and an output signal of the Y polarization component output from the polarization demultiplexing unit when the polarization demultiplexing is carried out using the CMA and improper convergence arises.

Similarly, FIG. 8A, FIG. 8B, and FIG. 8C show image diagrams of constellation diagrams of respective output signals of the X polarization component and the Y polarization component which are output from the polarization demultiplexing unit 430 when the polarization demultiplexing is carried out using the CMA and improper convergence arises, and the product of the two output signals, respectively.

As described above, the tap coefficients of the butterfly FIR filter is controlled so that the sum of the respective output signals of the X polarization component and the Y polarization component of the polarization demultiplexing unit 430 may become equal to zero or π, and by that means, a proper polarization demultiplexing can be performed.

Thus the part of the polarization demultiplexing device in the optical receiver of the second exemplary embodiment utilizes the information on the product of the two output signals of the X polarization component and the Y polarization component of the butterfly FIR filter as the guideline. The target for the control is to perform a control so that the product of the output signals may become the ideal state, that is, the state which the product of the two BPSK signals that are properly polarization demultiplexed should have.

That is to say, in the BPSK signals, the ideal state of the product of the outputs means that the phase becomes equal to zero or π. In other words, it means that the same state as that of the signal which is BPSK modulated at the transmitting side is obtained, and the phase sum of respective outputs of the X polarization component and the Y polarization component from the polarization demultiplexing unit 430 becomes equal to zero or π.

It is possible to translate that the ideal state of the product of the outputs which is properly polarization demultiplexed for the BPSK signal becomes equal to zero or π into that "the magnitude of the imaginary part of the product of the outputs is equal to zero" as the intended value in properly polarization demultiplexed. It is also possible to define it as "a predetermined value where the magnitude of the real part of the product of the outputs is not equal to zero" as another intended value. If the product of the X polarization output signal and the Y polarization output signal does not have the above-described characteristics when the outputs of the polarization demultiplexing unit 430 are monitored, that means the state in which the polarization demultiplexing is not performed properly.

It is only necessary, therefore, to perform a control to minimize the difference between the state at the time of the monitoring and the ideal state. If the difference is represented as a function of the tap coefficients, it is possible to minimize the difference by calculating a gradient of the difference for the tap coefficients by means of the method of steepest descent and by updating the tap coefficients, and consequently to obtain the ideal state.

It is possible to use for a control the magnitude of the difference from the intended value of a certain quantity and the magnitude of the difference from the intended value of another certain quantity at the same time. It is also acceptable, therefore, to perform a control in the case where the imaginary part is controlled as the ideal value and in the case where the real part is controlled as the ideal value at the same time, and to be controlled by combining those.

Figure 9:
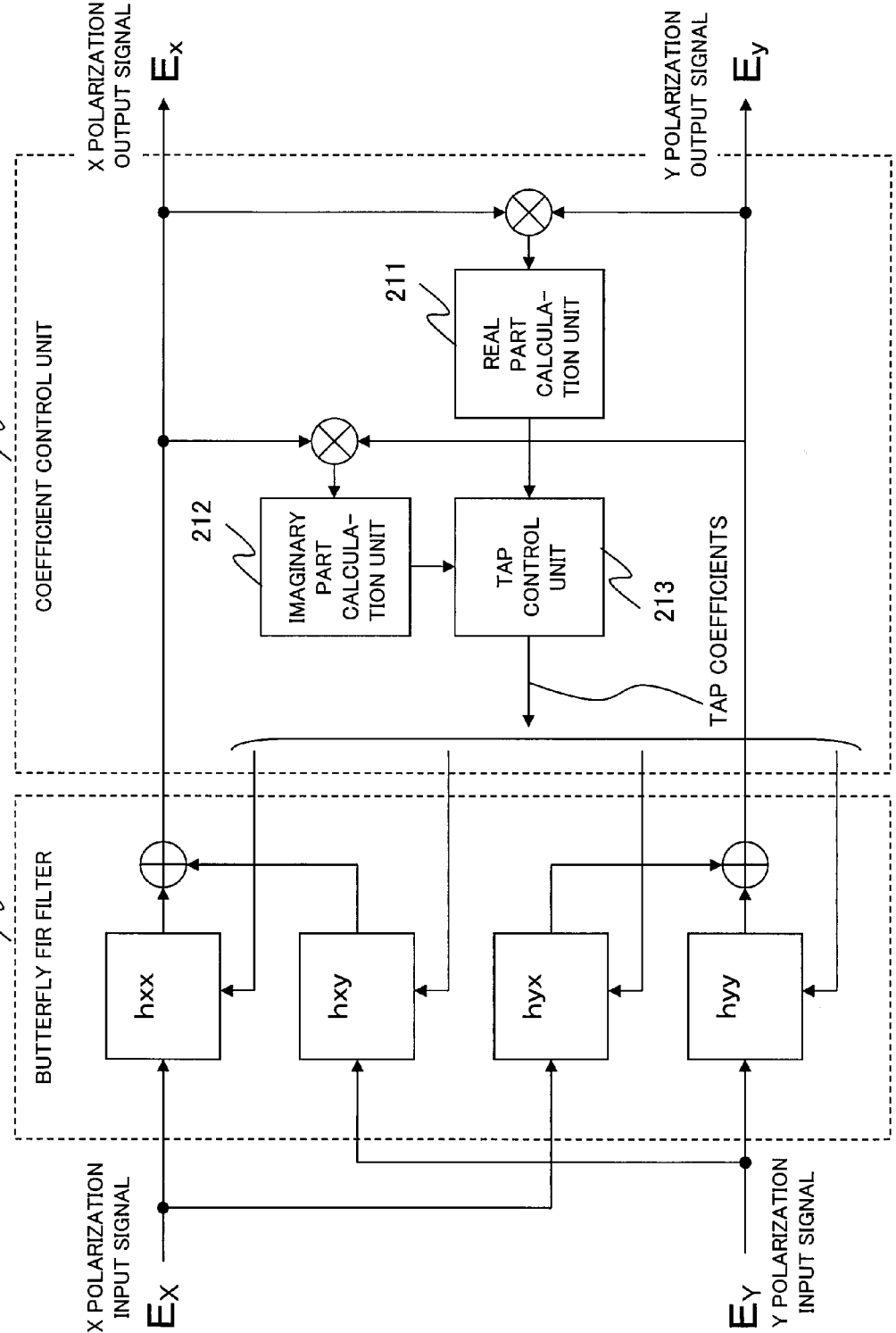
FIG. 9 is a block diagram illustrating a configuration of a polarization demultiplexing device in the optical receiver of the second exemplary embodiment.

FIG. 9 is a block diagram illustrating a configuration of a polarization demultiplexing device in the optical receiver of the second exemplary embodiment. This corresponds to the polarization demultiplexing unit 430 shown in FIG. 6.

The polarization demultiplexing unit 430 includes a butterfly FIR filter 11 and a coefficient control unit 21 to control the filter coefficients.

The butterfly FIR filter 11 extracts two signals modulated by the BPSK and polarization-multiplexed at the transmitting side from respective polarization component signals of the X polarization component and the Y polarization component which are split by the coherent optical detection means. That is to say, the X polarization input signal $E_X$ and the Y polarization input signal $E_Y$ are input and the X polarization output signal $E_x$ and the Y polarization output signal $E_y$ are output.

The coefficient control unit 21 adaptively controls the tap coefficients of the butterfly FIR filter 11 so that the sum of the phases of two signals which are polarization demultiplexed and output from the butterfly FIR filter 11 may become equal to zero or $\pi$. That is to say, the coefficient control unit 21 receives the X polarization output signal $E_x$ and the Y polarization output signal $E_y$ output from the butterfly FIR filter 11, multiplies those output signals, and appropriately updates the tap coefficients so that the phase of the product may become equal to zero or $\pi$.

As shown in FIG. 9, the coefficient control unit 21 includes a real part calculation unit 211, an imaginary part calculation unit 212, and a tap control unit 213. The coefficient control unit 21 can adopt a configuration to include the real part calculation unit 211 and the tap control unit 213, a configuration to include the imaginary part calculation unit 212 and the tap control unit 213, or a configuration to include the real part calculation unit 211, the imaginary part calculation unit 212, and the tap control unit 213.

The real part calculation unit 211 calculates and outputs the real part of the product of the output signals which is obtained by multiplying the X polarization output signal $E_x$ and the Y polarization output signal $E_y$ together output from the butterfly FIR filter 11. The imaginary part calculation unit 212 calculates and outputs the imaginary part of the product of the output signals which is obtained by multiplying the X polarization output signal $E_x$ and the Y polarization output signal $E_y$ together output from the butterfly FIR filter 11.

The tap control unit 213 receives the information on the calculated results from the real part calculation unit 211, the imaginary part calculation unit 212, or both of the real part calculation unit 211 and the imaginary part calculation unit 212 according to the configuration of the coefficient control unit 21 described above. The tap control unit 213 receives from the real part calculation unit 211 the value of the real part of the product of the output signals which is obtained by multiplying the X polarization output signal $E_x$ and the Y polarization output signal $E_y$ together output from the butterfly FIR filter 11. The tap control unit 213 also receives from the imaginary part calculation unit 212 the value of the imaginary part of the product of the output signals which is obtained by multiplying the X polarization output signal $E_x$ and the Y polarization output signal $E_y$ together output from the butterfly FIR filter 11.

The tap control unit 213 performs a control to update the tap coefficients of the butterfly FIR filter 11 so that the difference between respective values of the real part and the imaginary part and the intended values may be minimized according to the configuration of the coefficient control unit 21. That is to say, the magnitude of the difference between the intended value of "0" in the imaginary part and the intended value of "a certain predetermined value except zero" in the real part, and the value obtained by the output state of the butterfly FIR filter 11 at the time of monitoring is expressed as a function of the tap coefficients.

Figure 10:
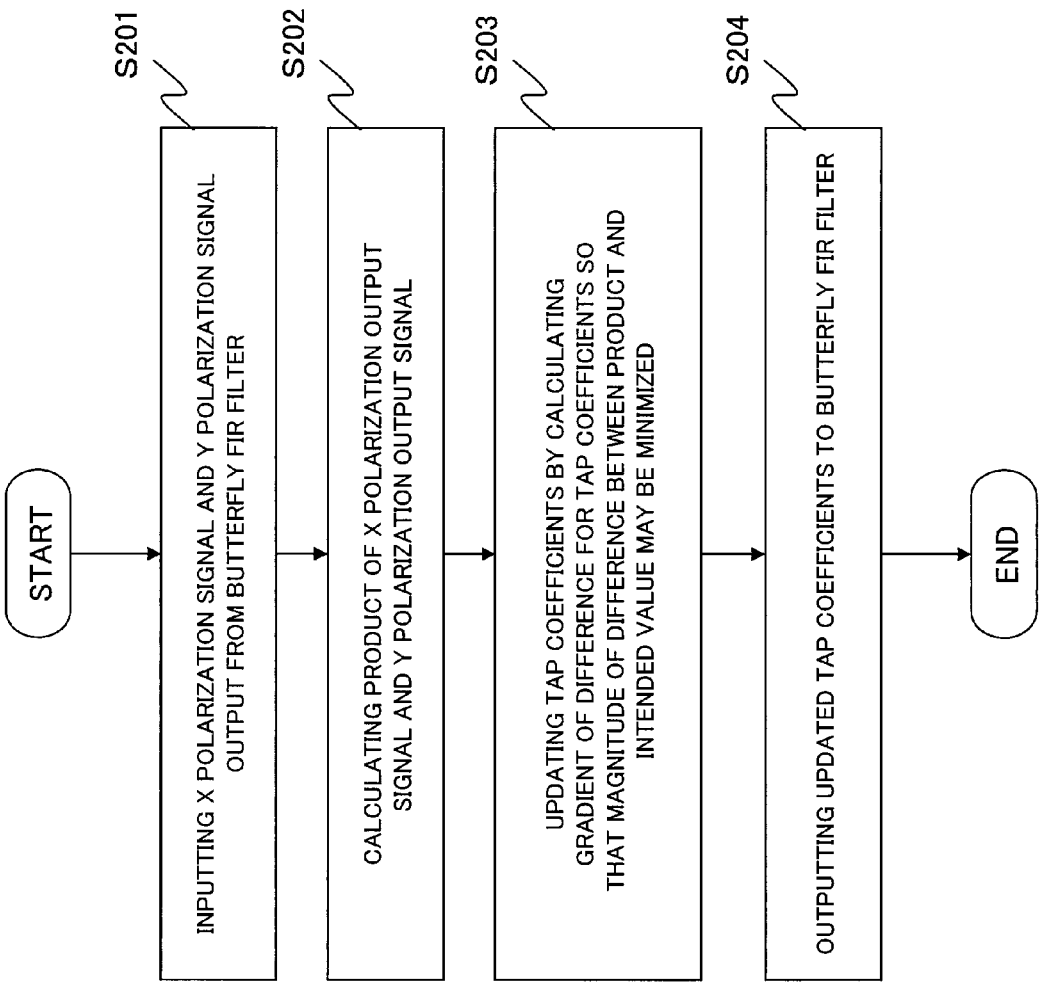
FIG. 10 is a flowchart illustrating an operation of a coefficient control unit in the optical receiver of the second exemplary embodiment.

FIG. 10 is a flowchart illustrating an operation of the coefficient control unit 21.

First, the X polarization output signal $E_x$ and the Y polarization output signal $E_y$ output from the butterfly FIR filter 11 are input (S201).

And then a value obtained by multiplying the X polarization output signal $E_x$ and the Y polarization output signal $E_y$ together is calculated (S202). The value can be calculated for the real part, the imaginary part, or both of the real part and the imaginary part, optionally.

The gradient of the difference for the tap coefficients is calculated and the tap coefficients are updated so that the magnitude of the difference between the product and the intended value may be minimized (S203). The updated tap coefficients are output to the butterfly FIR filter (S204).

As described above, the coefficient control unit 21 adaptively controls the tap coefficient of the butterfly FIR filter 11.

In order to control the tap coefficient of the butterfly FIR filter 11 so that the sum of the phases of respective outputs from the polarization demultiplexing unit 430 may become equal to zero or $\pi$, the following cost function can be used as "the magnitude of the difference from the intended value", for example.

$$f=\{1-(Re[E_xE_y])^2\}^2$$

The gradient of the cost function with respect to each tap coefficients is calculated so that the cost function may be minimized, and the tap coefficient is controlled by means of the method of steepest descent. Here, Re [a] represents a real number part of "a".

The input-output relation is expressed as follows with a butterfly FIR filter having one tap.

$$E_x = h_{xx}E_X + h_{xy}E_Y$$

$$E_y = h_{yx}E_X + h_{yy}E_Y$$

In this case, the updating rules for coefficients by means of the method of steepest descent are represented by following formulae (1) to (4), $$h_{xx} \to h_{xx} + \mu\{1-(Re[E_xE_y])^2\}(Re[E_xE_y])E^*_X E^*_y \quad (1)$$

$$h_{xy} \to h_{xy} + \mu\{1-(Re[E_xE_y])^2\}(Re[E_xE_y])E^*_Y E^*_y \quad (2)$$

$$h_{yx} \to h_{yx} + \mu\{1-(Re[E_xE_y])^2\}(Re[E_xE_y])E^*_X E^*_x \quad (3)$$

$$h_{yy} \to h_{yy} + \mu\{1-(Re[E_xE_y])^2\}(Re[E_xE_y])E^*_Y E^* \quad (4)$$

Here, $\mu$ is a parameter representing a magnitude of a feedback to coefficients, and E* represents a complex conjugate of E. This can be easily extended to N-tap.

By means of the coefficient updating rule for the butterfly FIR filter represented in the above formulae (1) to (4), the polarization demultiplexing is carried out without improper convergence and the X polarization output signal $E_x$ and the Y polarization output signal $E_y$ in the intended state are output.

Figure 11:
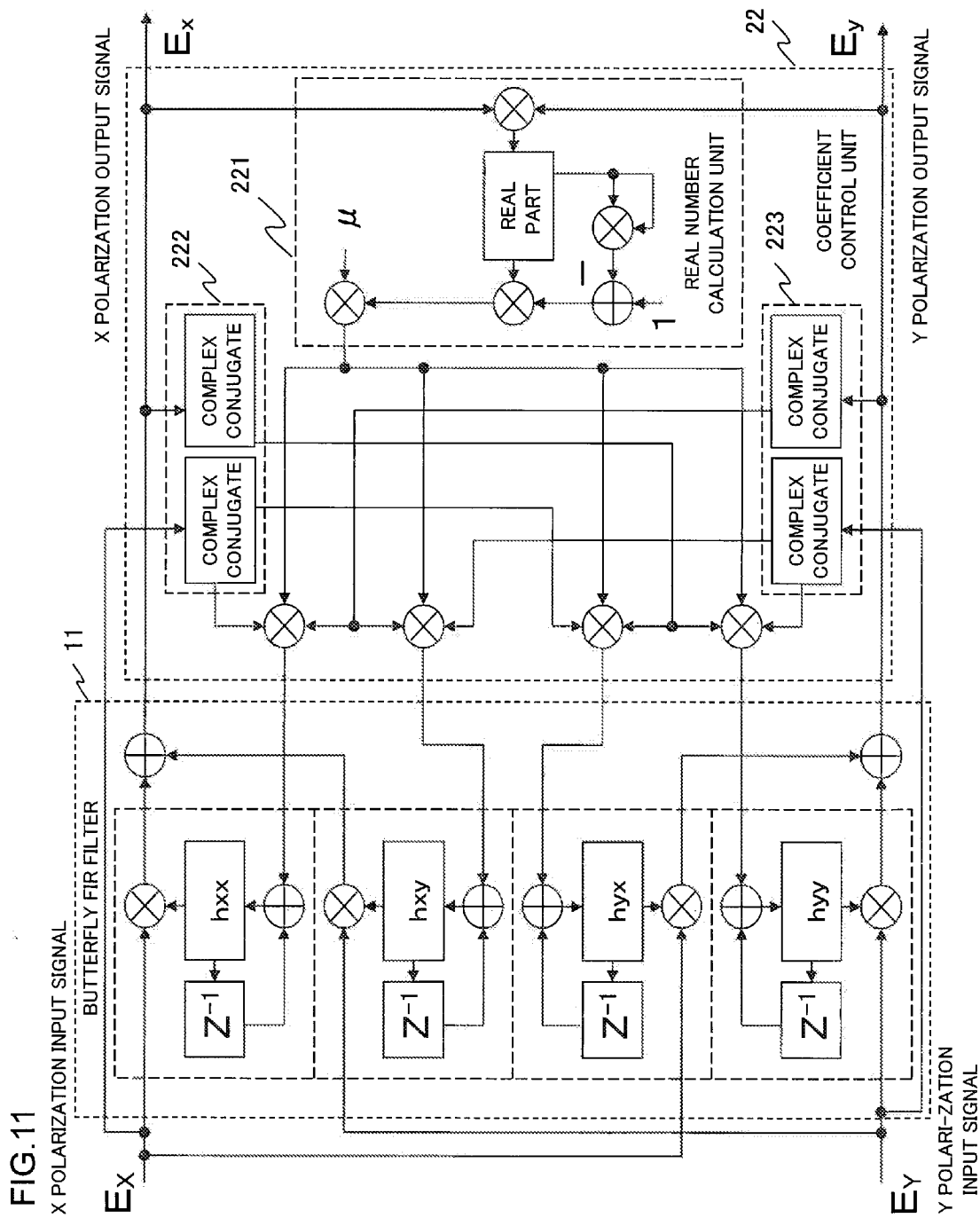
FIG. 11 is a block diagram illustrating a configuration of a polarization demultiplexing device in another optical receiver of the second exemplary embodiment.

FIG. 11 is a block diagram illustrating a configuration of the polarization demultiplexing unit 430 in the case that the tap coefficients of the butterfly FIR filter are controlled by the above formulae (1) to (4) in the second exemplary embodiment. The polarization demultiplexing unit 430 includes a butterfly FIR filter 11 and a coefficient control unit 22.

Each of the X polarization input signal $E_X$ and the Y polarization input signal $E_Y$, in which two polarization multiplexed signals are generally mixed, is input into the polarization demultiplexing unit 430. The butterfly FIR filter 11 outputs the X polarization output signal $E_x$ and the Y polarization output signal $E_y$. The tap coefficients of the butterfly FIR filter 11 are controlled by the coefficient control unit 22.

The coefficient control unit 22 includes a real number calculation unit 221 and complex conjugate obtaining units 222, 223. The real number calculation unit 221 multiplies the X polarization output signal $E_x$ by the Y polarization output signal $E_y$ and calculates the real part in the second term on the right side of each of the formulae (1) to (4). The complex conjugate unit 222 obtains a complex conjugate of each of the X polarization input signal $E_X$ and the X polarization output signal $E_x$. The complex conjugate unit 223 obtains a complex conjugate of each of the Y polarization input signal $E_Y$ and the Y polarization output signal $E_y$. The coefficient control unit 22 combines the real part of the product of the two output signals $E_x$ and $E_y$ calculated by the real number calculation unit 221 with each of signals $E_X$, $E_x$, $E_Y$ and $E_y$ obtained by the complex conjugate obtaining units 222, 223 and respective complex conjugates, and forms the second terms on the right side of the formulae (1) to (4).

Thus the coefficient control unit 22 controls the tap coefficients by the second terms on the right side of the formulae (1) to (4). That is to say, the second terms on the right side of the formulae (1) to (4) correspond to updated amounts of the tap coefficients, and calculating them is called "calculating a gradient for the tap coefficient". Thereby the sum of the phases of the respective outputs of the polarization demultiplexing unit 430 becomes equal to zero or $\pi$, and accordingly the proper polarization demultiplexing is achieved without improper convergence.

That is to say, a magnitude of the difference, between the value of the product which is obtained by multiplying the X polarization output signal and the Y polarization output signal together and the intended value which can be taken when two multiplexed signals are properly polarization demultiplexed, is expressed as the cost function. And the coefficient control unit 22 in the polarization demultiplexing unit 430 shown in FIG. 11 performs a control to update the tap coefficient of the butterfly FIR filter.

Figure 12A:
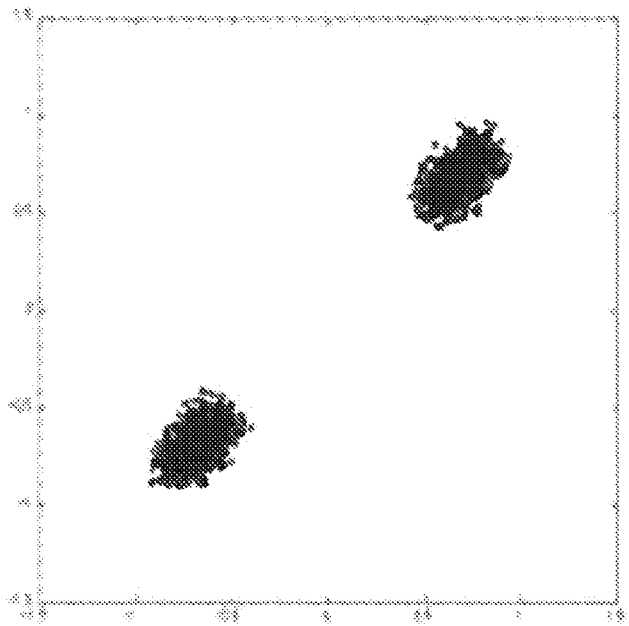
FIG. 12A is a constellation diagram of an output signal of an X polarization component output from the polarization demultiplexing unit when a simulation is performed on another optical receiver in the second exemplary embodiment.
Figure 12B:
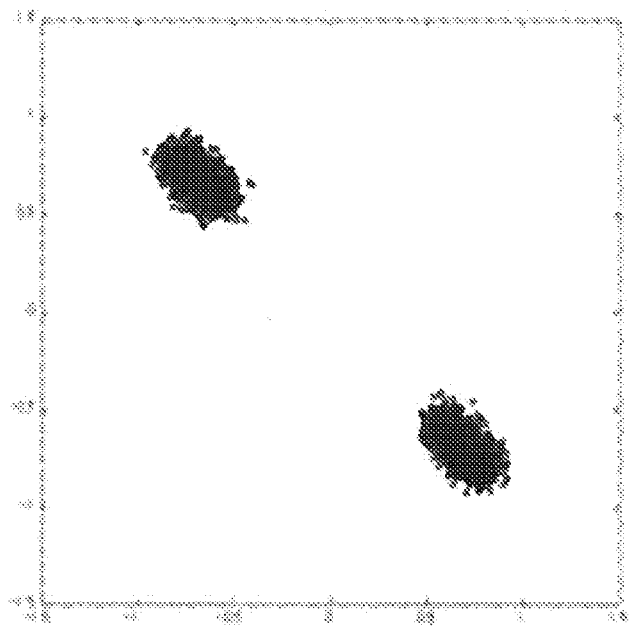
FIG. 12B is a constellation diagram of an output signal of a Y polarization component output from the polarization demultiplexing unit when a simulation is performed on another optical receiver in the second exemplary embodiment.

FIG. 12A and FIG. 12B show constellation diagrams of respective output signals output from the polarization demultiplexing unit 430 when the simulation is performed on the optical receiver in the second exemplary embodiment by the system configuration shown in FIG. 6.

Figure 3A:
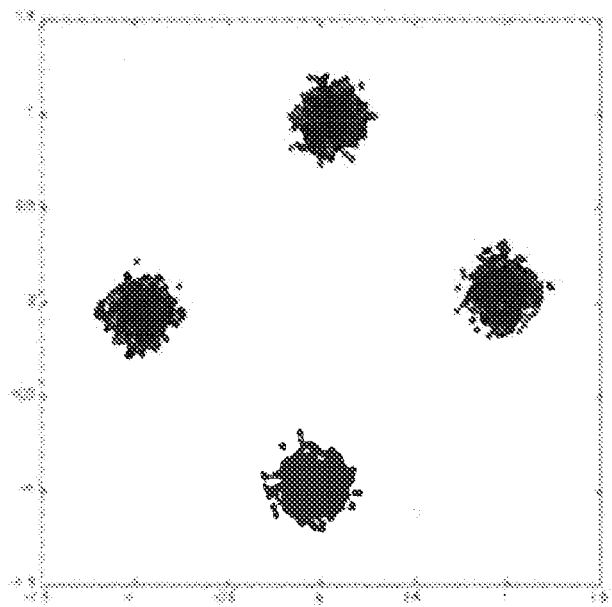
FIG. 3A is a constellation diagram of the X polarization output signal $E_x$ which is polarization demultiplexed by using the CMA and wrongly converges with respect to the polarization multiplexed BPSK signal which is multiplexed with carrier phase difference of π/2 in polarization multiplexing.
Figure 3B:
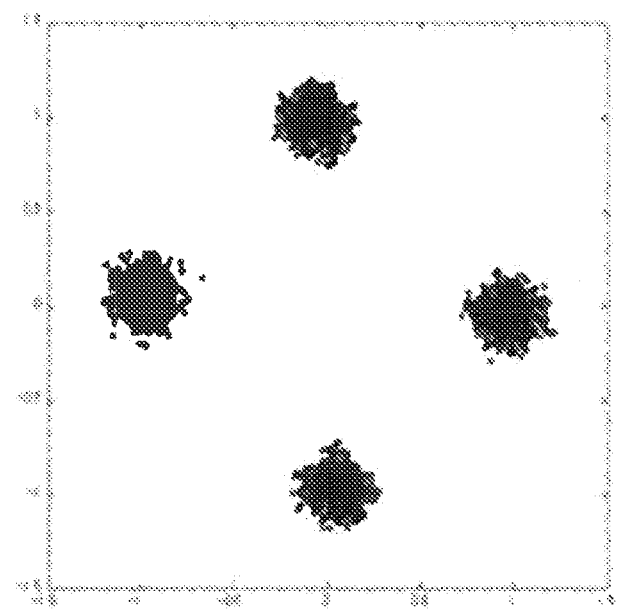
FIG. 3B is a constellation diagram of the Y polarization output signal $E_y$ which is polarization demultiplexed by using the CMA and wrongly converges with respect to the polarization multiplexed BPSK signal which is multiplexed with carrier phase difference of π/2 in polarization multiplexing.

If the polarization demultiplexing is performed using CMA adding the phase difference of $\pi/2$ to each carrier phase in polarization multiplexing in the polarization multiplexing BPSK signal transmission device 20, the signals shown in FIG. 3 are output and improper convergence arises, which case is simulated. In this case, the optical receiving device 10 performs homodyne detection by means of matching a carrier frequency transmitted from the polarization multiplexing BPSK signal transmission device 20 and a frequency of the local oscillation light source 200 in the optical receiving device 10.

In FIG. 12A and FIG. 12B, unlike in the case of FIG. 3, binary signal point constellation is obtained in each output signal of the polarization demultiplexing unit 430. The X polarization output signal $E_x$ in FIG. 11 differs from the Y polarization output signal $E_y$ in a carrier phase by $\pi/2$, but there is no problem as long as signals are demultiplexed into respective BPSK signals. That is to say, there is no problem because each carrier phase can be separately compensated by the carrier phase compensation unit located in the subsequent stage. Thus, the polarization multiplexed BPSK signal is properly demultiplexed by the present invention.

The case has been described above in which the tap coefficients of the butterfly FIR filter are controlled by the formulae (1) to (4) using one cost function as an example.

The cost function, however, to control the tap coefficients of the butterfly FIR filter so that the sum of the phases of respective outputs of the polarization demultiplexing unit 430 may become equal to zero or $\pi$, is not limited to the above formula. The cost functions described below and their combination can be used, for example.

$$f=\{r^P(Re[E_xE_y])^P\}^q$$

where r is a real number, p and q are arbitrary even numbers which are equal to or more than 2.

$$f=(Im[E_xE_y])^P$$

where p is an arbitrary even number which is equal to or more than 2. Im[a] represents an imaginary part of a.

In case of $f=(Im[E_xE_y])^4$, for example, the updating rule for coefficients by means of the method of steepest descent is expressed by the following formulae.

$$h_{xx} \to h_{xx}-i\mu(Im[E_xE_y])^3 E^*_X E^*_y$$

$$h_{xy} \to h_{xy}-i\mu(Im[E_xE_y])^3 E^*_Y E^*_y$$

$$h_{yx} \to h_{yx}-i\mu(Im[E_xE_y])^3 E^*_X E^*_x$$

$$h_{yy} \to h_{yy}-i\mu(Im[E_xE_y])^3 E^*_Y E^*_x$$

Thus, it is also acceptable to control the tap coefficients of the butterfly FIR filter so that the sum of the phases of respective outputs of the polarization demultiplexing unit 430 may become equal to zero or $\pi$ on the basis of the updating rule to handle an imaginary part.

A magnitude of difference from an intended value of a certain quantity and a magnitude of difference from an intended value of another certain quantity can be used for control at the same time. It is also acceptable, therefore, to perform simultaneously a control of the imaginary part as an intended value and a control of the real part as an intended value, and to perform a control by their combination.

That is to say, according to the method of steepest descent, in order to calculate $\xi$ which minimizes a function $f(\xi)$ of a variable number $\xi$, $\xi$ is controlled by the following updating rule.

$$\xi \to \xi - \mu \frac{\partial f(\xi)}{\partial \xi}$$

That is to say, $\xi$ which minimizes $\alpha f(\xi)+\beta g(\xi)$ can be calculated as follows.

$$\xi \to \xi - \mu \frac{\partial f(\xi)}{\partial \xi} - \nu \frac{\partial g(\xi)}{\partial \xi}$$

In the above formula, $\alpha\mu$ is replaced with $\mu$, and $\beta\mu$ is replaced with $\nu$.

In the polarization demultiplexing process using the butterfly FIR filter 11, if there are two cost functions to be minimized, it is possible to update redundantly the tap coefficients using the respective cost functions.

It is possible to control the tap coefficients on the basis of the formula in which the above-mentioned formulae of the updating rule handling the imaginary part is combined with the updating rule handling the real parts of the formulae (1) to (4), for example.

If the tap coefficients are controlled on the basis of the formula in which the above-mentioned formulae of the updating rule handling the imaginary part is combined with the updating rule handling the real parts of the formulae (1) to (4), the control of updating the tap coefficients will be performed by using the following formulae.

$$h_{xx} \to h_{xx} + \mu\{1-(Re[E_xE_y])^2\}(Re[E_xE_y])E^*_X E^*_y - i\mu(Im[E_xE_y])^3 E^*_X E^*_y$$

$$h_{xy} \to h_{xy} + \mu\{1-(Re[E_xE_y])^2\}(Re[E_xE_y])E^*_Y E^*_y - i\mu(Im[E_xE_y])^3 E^*_Y E^*_y$$

$$h_{yx} \to h_{yx} + \mu\{1-(Re[E_xE_y])^2\}(Re[E_xE_y])E^*_X E^*_x - i\mu(Im[E_xE_y])^3 E^*_X E^*_x$$

$$h_{yy} \to h_{yy} + \mu\{1-(Re[E_xE_y])^2\}(Re[E_xE_y])E^*_Y E^*_x - i\mu(Im[E_xE_y])^3 E^*_Y E^*_x$$

That is to say, it is also acceptable for the polarization demultiplexing device part in the optical receiver of the second exemplary embodiment to operate as follows. First, the product of the two output signals of the butterfly FIR filter is calculated, and with respect to any one of a difference in a magnitude of the real part from the intended value, a difference in a magnitude of the imaginary part from the intended value, and the combination of them, a gradient for each tap coefficient is calculated. And with respect to any one of a difference in a magnitude of the real part from the intended value, a difference in a magnitude of the imaginary part from the intended value, and the combination of them, the tap coefficients are controlled so as to minimize the difference.

Thereby, it is possible to demultiplex properly the BPSK signal which is multiplexed in polarization and transmitted without using a training sequence. Since the information on the product of the two output signals of the X polarization component and the Y polarization component of the butterfly FIR filter is used as the guideline for the control, the processing can be performed without decreasing the resistance to a frequency offset.

Next, the third exemplary embodiment will be described.

The system configuration diagram in FIG. 6 is also applied to the polarization demultiplexing device part in the optical receiver of the third exemplary embodiment. And the polarization demultiplexing device part in the optical receiver of the third exemplary embodiment corresponds to the polarization demultiplexing unit 430 in the digital signal processing unit 400 shown shown in FIG. 6.

Figure 13:
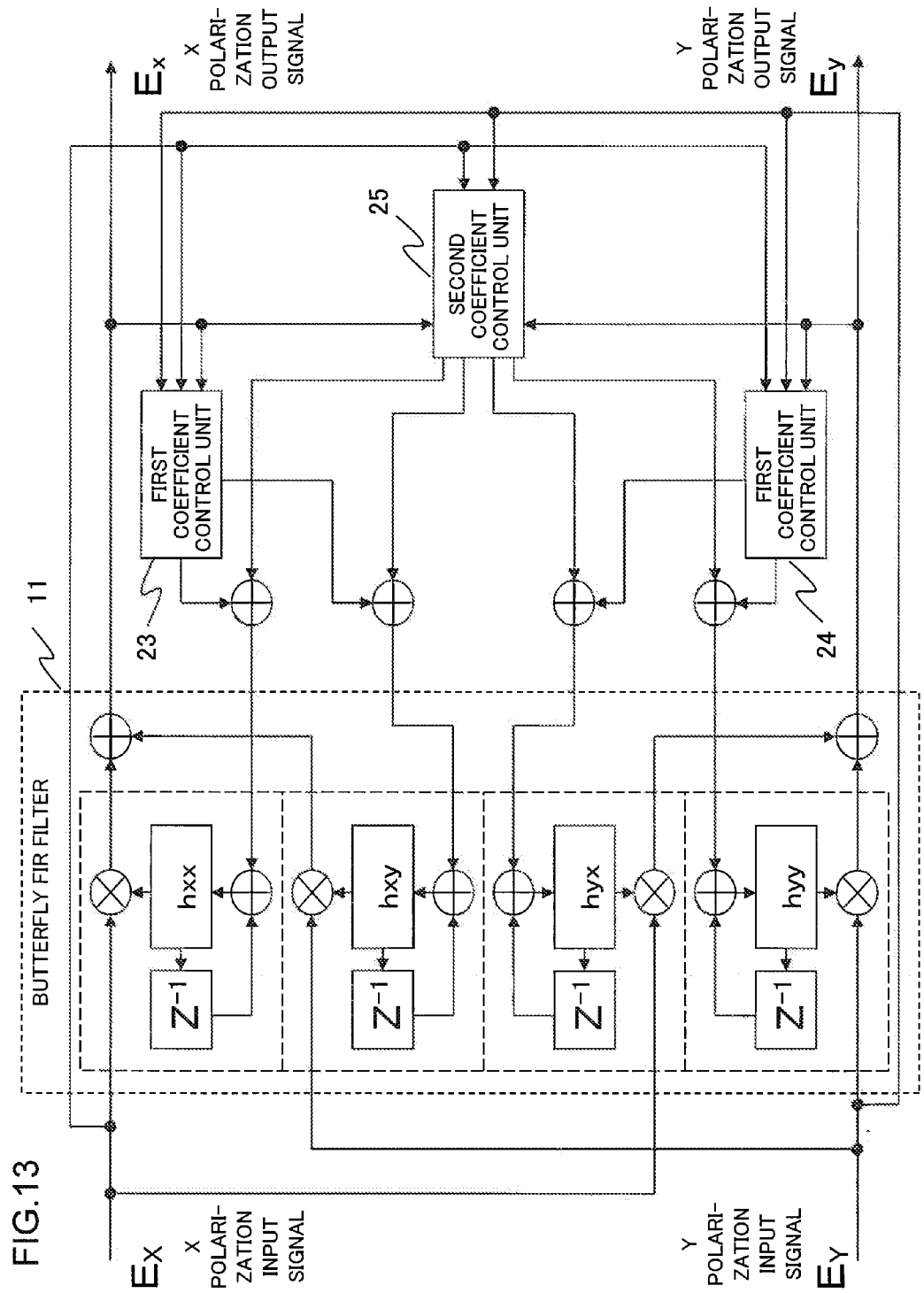
FIG. 13 is a block diagram illustrating a configuration of a polarization demultiplexing device part in an optical receiver of the third exemplary embodiment.

FIG. 13 is a block diagram illustrating a configuration of a polarization demultiplexing device part in an optical receiver of the third exemplary embodiment.

The polarization demultiplexing unit 430 includes the butterfly FIR filter 11, a first coefficient control units 23 and 24, and a second coefficient control unit 25. Each of the first coefficient control units 23 and 24 is a coefficient control unit which controls the tap coefficients of the butterfly FIR filter using CMA. The second coefficient control unit 25 is a coefficient control unit which controls the tap coefficients by the method described in the second exemplary embodiment.

The polarization demultiplexing unit 430 of the polarization demultiplexing device in the third exemplary embodiment performs the polarization demultiplexing by combining the CMA with the method described in the second exemplary embodiment.

The updating rule for the tap coefficients using CMA is expressed by the following formulae (5) to (8) as described in Non Patent Literature 1.

$$h_{xx} \to h_{xx} + \nu(1-|E_x|^2)E_xE^*_X \quad (5)$$

$$h_{xy} \to h_{xy} + \nu(1-|E_x|^2)E_xE^*_Y \quad (6)$$

$$h_{yx} \to h_{yx} + \nu(1-|E_y|^2)E_yE^*_X \quad (7)$$

$$h_{yy} \to h_{yy} + \nu(1-|E_y|^2)E_yE^*_Y \quad (8)$$

where $\nu$ is a parameter representing a magnitude of a feedback to the tap coefficients by the CMA.

The first coefficient control units 23 and 24 in the polarization demultiplexing unit 430 receives $E_X$, $E_Y$, $E_x$ and $E_X$, $E_Y$, $E_y$. The first coefficient control unit 23 calculates the second terms on the right side of the formulae (5) and (6), and outputs the results. The first coefficient control unit 24 calculates the second terms on the right side of the formulae (7) and (8), and outputs the results. That is to say, each of the first coefficient control units calculates a gradient of a difference in a magnitude of each output of the butterfly FIR filter from the intended value with respect to each of the tap coefficients of the butterfly FIR filter. The second coefficient control unit 21 outputs the second terms on the right side of the formulae (1) to (4) as is the case with the coefficient control unit in the second exemplary embodiment.

The polarization demultiplexing unit 430 figures out a sum of the second term on the right side of the formula (5) calculated in the first coefficient control unit 23 and the second term on the right side of the formula (1) calculated in the second coefficient control unit 25, for example. The sum is added to the tap coefficient $h_{xx}$ of the butterfly FIR filter 11 to update it.

Similarly, the sum of the second term on the right side of the formula (6) calculated in the first coefficient control unit 23 and the second term on the right side of the formula (2) calculated in the second coefficient control unit 25 is added to the tap coefficient $h_{xy}$ of the butterfly FIR filter 11. The sum of the second term on the right side of the formula (7) calculated in the first coefficient control unit 24 and the second term on the right side of the formula (3) calculated in the second coefficient control unit 25 is added to the tap coefficient $h_{yx}$ of the butterfly FIR filter 11. And the sum of the second term on the right side of the formula (8) calculated in the first coefficient control unit 24 and the second term on the right side of the formula (4) calculated in the second coefficient control unit 25 is added to the tap coefficient $h_{yy}$ of the butterfly FIR filter 11.

Thereby, it is possible to perform the polarization-demultiplexing by combining the CMA with the method described in the second exemplary embodiment.

The update of the tap coefficients by the CMA and the update of the tap coefficients by the method described in the second exemplary embodiment do not necessarily have to be performed simultaneously. It is also acceptable to update the tap coefficients by the method described in the second exemplary embodiment after updating the tap coefficients by the CMA to some extent. It is also acceptable to change a magnitude of the feedback into these two tap coefficients. That is to say, $\mu$ in the formulae (1) to (4) can be equal to, or different from a value of $\nu$ in the formulae (5) to (8).

In the third exemplary embodiment, it is possible to perform the polarization demultiplexing and the polarization mode dispersion compensation more stable compared with the method for updating the tap coefficients by the formulae (1) to (4) using the following cost function exemplified in the second exemplary embodiment.

$$f=\{1-(Re[E_xE_y])^2\}^2$$

That is because it is assured that the output amplitude from the polarization demultiplexing unit 430 becomes constant by updating the tap coefficient using the CMA.

In the third exemplary embodiment, it is possible to appropriately demultiplex the BPSK signals which are polarization-multiplexed and transmitted without using a training sequence. Since the information on the product of the two output signals of the X polarization component and the Y polarization component from the butterfly FIR filter is used as a guideline for the control, it is possible to perform the processing without decreasing the resistance to a frequency offset.

As described above, the optical receiver in the exemplary embodiments of the present invention uses the product of the two signals output from the butterfly FIR filter in the polarization demultiplexing device part as a guideline for the control. It is also possible in a case other than the exemplary embodiments of the present invention to utilize the product of the respective output signals from the butterfly FIR filter used for the polarization demultiplexing, for example, an average of the difference in the magnitude of the real part of the product from the intended value, or an amount corresponding to the average of the difference in the magnitude of the imaginary part of the product from the intended value. That is to say, not only in the BPSK modulation but also in other modulation systems, it is possible to use the product of two output signals output from the butterfly FIR filter as additional information to control the coefficients of the butterfly FIR filter used for the polarization demultiplexing.

In the above descriptions, the exemplary embodiments are described by using the butterfly FIR filter as a means for polarization demultiplexing, but it is not limited to this. It is also acceptable to use a butterfly-type digital filter configured in a frequency region and control the coefficients.

Generally, these filters can be called a means for polarization demultiplexing.

While the invention has been particularly shown and described with reference to exemplary embodiments thereof, the invention is not limited to the above-mentioned embodiments. It will be understood by those of ordinary skill in the art that various changes in form and details may be made therein without departing from the scope of the present invention.

This application is based upon and claims the benefit of priority from Japanese Patent Application No. 2011-045189, filed on Mar. 2, 2011, the disclosure of which is incorporated herein in its entirety by reference.

DESCRIPTION OF THE CODES

1 coherent optical detection means
2, 11 butterfly FIR filter
3 coefficient control means
20 polarization multiplexed BPSK signal transmission device
21, 22 coefficient control unit
23, 24 first coefficient control unit
25 second coefficient control unit
30 optical fiber transmission line
100 coherent optical receiving unit
200, 560 local oscillation light source
211 real part calculation unit
212 imaginary part calculation unit
213 tap control unit
221 real number calculation unit
222, 223 complex conjugate obtaining unit
300, 541, 542 A/D conversion unit
400, 550 digital signal processing unit
410 dispersion compensation unit
420 retiming unit
430 polarization demultiplexing unit
440 carrier phase compensation unit
450 data decision unit
10, 500 optical receiving device
511, 512 polarization beam splitter
521, 522 optical hybrid circuit
531, 532 O/E conversion unit
611, 612 coefficient control unit
621 $h_{xx}$ filter
622 $h_{xy}$ filter
623 $h_{yx}$ filter
624 $h_{yy}$ filter
631, 632 complex adder

The invention claimed is:

1. An optical receiver, comprising:
a coherent optical detector receiving an optical signal in which a plurality of BPSK modulated carrier waves are polarization-multiplexed, performing coherent detection by mixing the received optical signal with local light, and outputting a plurality of first electrical signals corresponding to the plurality of carrier waves;
a butterfly FIR filter receiving the plurality of first electrical signals and extracting a plurality of second electrical signals corresponding to each of the plurality of carrier waves from the plurality of first electrical signals; and
a coefficient controller calculating a sum of respective phases of the second electrical signals output from the butterfly FIR filter, adaptively controlling tap coefficients of the butterfly FIR filter so that the calculated phase sum may become equal to 0 or π, and outputting tap coefficients after being controlled to the butterfly FIR filter.

2. The optical receiver according to claim 1,
wherein the coefficient controller comprises
a real part calculator calculating and outputting a real part of a product of output signals obtained by multiplying each of the second electrical signals output from the butterfly FIR filter; and
a tap controller calculating an amount for updating the tap coefficients of the butterfly FIR, on the basis of a difference between a value of the real part of the product of output signals output from the real part calculator and an intended value of the real part to be obtained if each of the second electrical signals is appropriately polarization-demultiplexed, so as to minimize the difference, and performing a control to update the tap coefficients on the basis of the amount for updating.

3. The optical receiver according to claim 1,
wherein the coefficient controller comprises
an imaginary part calculator calculating and outputting an imaginary part of a product of output signals obtained by multiplying each of the second electrical signals output from the butterfly FIR filter; and
a tap controller calculating an amount for updating the tap coefficients of the butterfly FIR, on the basis of a difference between a value of the imaginary part of the product of output signals output from the imaginary part calculator and an intended value of the imaginary part to be obtained if each of the second electrical signals is appropriately polarization-demultiplexed, so as to minimize the difference, and performing a control to update the tap coefficients on the basis of the amount for updating.

4. The optical receiver according to claim 2, wherein the coefficient controller further comprises an imaginary part calculator calculating and outputting an imaginary part of a product of output signals obtained by multiplying each of the second electrical signals output from the butterfly FIR filter, and the tap controller calculating a gradient of a difference between a value obtained by combining the value of the real part of the product of output signals output from the real part calculator with the value of the imaginary part of the product of output signals output from the imaginary part calculator, and a value obtained by combining the intended value of the real part and an intended value of an imaginary part to be obtained if each of the second electrical signals is appropriately polarization-demultiplexed, with respect to the tap coefficients of the butterfly FIR filter, and performing a control to update the tap coefficients so as to minimize the difference.

5. The optical receiver according to claim 1, wherein the coefficient controller performing a control to express, as a cost function, a magnitude of a difference between the value of the product of output signals obtained by multiplying each of the second electrical signals output from the butterfly FIR filter and the intended value to be obtained if each of the second electrical signals is appropriately polarization-demultiplexed, and to update the tap coefficients of the butterfly FIR filter on the basis of a formula calculated by a method of steepest descent.

6. An optical receiver, comprising:
a coherent optical detector receiving an optical signal in which a plurality of BPSK modulated carrier waves are polarization-multiplexed, performing coherent detection by mixing the received optical signal with local light, and outputting a plurality of first electrical signals corresponding to the plurality of carrier waves;
a butterfly FIR filter receiving the plurality of first electrical signals and extracting a plurality of second electrical signals corresponding to each of the plurality of carrier waves from the plurality of first electrical signals; and
a coefficient control unit comprising a first coefficient controller performing a control to update tap coefficients of the butterfly FIR filter by means of the CMA (Constant Modulus Algorithm), and a second coefficient controller performing a control to express, as a cost function, a magnitude of a difference between the value of the product of output signals obtained by multiplying each of the second electrical signals output from the butterfly FIR filter and the intended value to be obtained if each of the second electrical signals is appropriately polarization-demultiplexed, and to update the tap coefficients of the butterfly FIR filter on the basis of a formula calculated by a method of steepest descent.

7. A polarization demultiplexer, comprising:
a butterfly FIR filter extracting two signals polarization-multiplexed and BPSK modulated at a transmitting side as each second polarization component signal, from respective first polarization component signals in two orthogonal polarized waves demultiplexed by a coherent optical detector; and
a coefficient controller adaptively controlling tap coefficients of the butterfly FIR filter so that a sum of a phase of each second polarization wave component signal output from the butterfly FIR filter may become equal to 0 or $\pi$, and outputting the tap coefficients to the butterfly FIR filter.

8. An optical receiving method, comprising:
receiving an optical signal in which a plurality of BPSK modulated carrier waves are polarization-multiplexed, performing coherent detection by mixing the received optical signal with local light, and outputting a plurality of first electrical signals corresponding to the plurality of carrier waves;
inputting the plurality of first electrical signals into a butterfly FIR filter, and extracting each of a plurality of second electrical signals corresponding to each of the plurality of carrier waves from the plurality of first electrical signals; and
calculating a sum of respective phases of the second electrical signals output from the butterfly FIR filter, adaptively controlling tap coefficients of the butterfly FIR filter so that the calculated phase sum may become equal to 0 or $\pi$, and outputting tap coefficients after being controlled to the butterfly FIR filter.

9. An optical receiver, comprising:
a coherent optical detector receiving an optical signal in which a plurality of BPSK modulated carrier waves are polarization-multiplexed, performing coherent detection by mixing the received optical signal with local light, and outputting a plurality of first electrical signals corresponding to the plurality of carrier waves;
a butterfly FIR filter receiving the plurality of first electrical signals and extracting a plurality of second electrical signals corresponding to each of the plurality of carrier waves from the plurality of first electrical signals; and
a coefficient controller calculating a value obtained by multiplying each of the second electrical signals output from the butterfly FIR filter, adaptively controlling tap coefficients of the butterfly FIR filter so that the calculated value may be optimized, and outputting tap coefficients after being controlled to the butterfly FIR filter.

10. The optical receiver according to claim 2, wherein the coefficient controller performing a control to express, as a cost function, a magnitude of a difference between the value of the product of output signals obtained by multiplying each of the second electrical signals output from the butterfly FIR filter and the intended value to be obtained if each of the second electrical signals is appropriately polarization-demultiplexed, and to update the tap coefficients of the butterfly FIR filter on the basis of a formula calculated by a method of steepest descent.

11. The optical receiver according to claim 3, wherein the coefficient controller performing a control to express, as a cost function, a magnitude of a difference between the value of the product of output signals obtained by multiplying each of the second electrical signals output from the butterfly FIR filter and the intended value to be obtained if each of the second electrical signals is appropriately polarization-demultiplexed, and to update the tap coefficients of the butterfly FIR filter on the basis of a formula calculated by a method of steepest descent.

12. The optical receiver according to claim 4, wherein the coefficient controller performing a control to express, as a cost function, a magnitude of a difference between the value of the product of output signals obtained by multiplying each of the second electrical signals output from the butterfly FIR filter and the intended value to be obtained if each of the second electrical signals is appropriately polarization-demultiplexed, and to update the tap coefficients of the butterfly FIR filter on the basis of a formula calculated by a method of steepest descent.

* * * * *